(12) United States Patent
Kay et al.

(10) Patent No.: US 7,203,060 B2
(45) Date of Patent: Apr. 10, 2007

(54) DISK DRIVE SUPPORT ASSEMBLY, CLAMP ASSEMBLY AND DISK DRIVE CARRIER

(75) Inventors: Alexander S. Kay, Portsmouth (GB); Timothy J. Muncaster, Ryde (GB); Andrew J. Nineham, Horndean (GB); Andrew W. Atkins, Southampton (GB)

(73) Assignee: Xyratex Technology Limited, Hampshire (GB)

( * ) Notice: Subject to any disclaimer, the term of this patent is extended or adjusted under 35 U.S.C. 154(b) by 242 days.

(21) Appl. No.: 10/866,074

(22) Filed: Jun. 14, 2004

(65) Prior Publication Data
US 2005/0018397 A1 Jan. 27, 2005

Related U.S. Application Data

(60) Provisional application No. 60/478,467, filed on Jun. 16, 2003.

(51) Int. Cl.
*G06F 1/16* (2006.01)
*G11B 5/012* (2006.01)

(52) U.S. Cl. ............... 361/685; 360/97.01; 269/6
(58) Field of Classification Search ........ 361/679–687, 361/724–727; 360/97.01, 75; 269/6; 318/476; 385/88
See application file for complete search history.

(56) References Cited

U.S. PATENT DOCUMENTS 3,875,589 A 4/1975 Applequist et al.
4,980,783 A 12/1990 Moir et al.
5,617,267 A 4/1997 Kawagoe et al.
6,018,437 A * 1/2000 Weichelt et al. ......... 360/97.01
6,256,164 B1 7/2001 Choi
6,685,176 B2 * 2/2004 Wirth et al. ................ 269/6
6,785,082 B2 * 8/2004 Fiorvanti et al. ........... 360/75

FOREIGN PATENT DOCUMENTS

WO WO 00/41177 7/2000
WO WO 01/22410 A1 3/2001
WO WO 03/038816 A1 5/2003

* cited by examiner

*Primary Examiner*—Hung Van Duong
(74) *Attorney, Agent, or Firm*—Pillsbury Winthrop Shaw Pittman, LLP

(57) ABSTRACT

A disk drive support assembly has a clamp arrangement for releasably clamping a disk drive to a massive block. The clamp arrangement may be an inflatable actuator that is operable to clamp the disk drive to the block via a disk drive carrier. Various clamp assemblies for clamping a disk drive to a substrate, such as a disk drive carrier, are also disclosed. A disk drive carrier that can be adapted for use with different types of disk drive is also disclosed. Such disk drives include those that provide for electrical and/or data connections under the disk drive, those that provide for electrical and/or data connections at the rear of the disk drive, and those that have their own so-called product card associated therewith.

38 Claims, 22 Drawing Sheets

DISK DRIVE SUPPORT ASSEMBLY, CLAMP ASSEMBLY AND DISK DRIVE CARRIER

The present invention claims priority from U.S. Ser. No. 60/478,467 filed Jun. 16, 2003, the entire content of which is incorporated herein in its entirety.

FIELD OF THE INVENTION

The present invention relates to a disk drive support assembly, a clamp assembly, and a disk drive carrier.

DESCRIPTION OF RELATED ART

There are a number of applications when it is necessary to mount a disk drive in some other apparatus. These include for example when the disk drive is tested during manufacture and when the disk drive is in use for data storage applications or the like. A particular application is when servo tracks are written to the disk drive during the manufacturing process. Servo tracks are used during normal use of the disk drive to enable the read/write head (also known as the product head) of the disk drive to know its location over the disk(s). Two particular emergent technologies for writing servo tracks are the self-servo writing process and the self-servo fill process. In the former case, the product head is used to write all of the servo tracks whilst the disk drive is mounted in the servo writing station. In the latter case, only some of the servo tracks are written by the product head whilst the disk drive is in the servo writer station, the remainder being written (again by the product head) after the disk drive has been removed from the servo writing station. In either of these types, the product head is used to locate itself over the disk. On the other hand, the more conventional type of servo track writing uses a separate clock head provided externally of the disk drive.

In order to damp vibrations, which mainly arise from rotation of the disk during the servo writing process, the disk drive is typically clamped to a relatively massive block, which is typically of steel or granite. A typical arrangement is disclosed in U.S. Pat. No. 6,018,437. This document discloses the use of four clamps to clamp a disk drive directly to a relatively massive block. The disk drive is manually loaded onto the block and manoeuvred by hand so that appropriate data and electrical connections to the disk drive are made. However, this and the other similar known arrangements do not lend themselves to automated loading and unloading of disk drives using robots or other automated machinery.

Other mounting arrangements for disk drives are disclosed in WO-A-97/06532, WO-A-03/021597 and WO-A-03/021598. However, in the first of these prior art arrangements, clamping and unclamping of the disk drive is in essence a manual operation, and the arrangement again does not lend itself too automation. Also, the wedges, which provide the clamping force, do not operate independently of each other. In the second and third of these prior art arrangements, the disk drive is not fully clamped until it has been mounted in a tester rack or servo track writing station or the like.

SUMMARY OF THE INVENTION

It is an object of the present invention to overcome one or more of the problems mentioned above.

According to a first aspect of the present invention, there is provided a disk drive support assembly constructed and arranged to support a disk drive whilst servo tracks are written to a disk of the disk drive, the assembly comprising: a removable disk drive carrier for carrying a disk drive; a relatively massive block; and, a clamp arrangement constructed and arranged to releasably clamp a disk drive to the block.

By using a discrete, removable disk drive carrier instead of clamping the disk drive directly to the relatively massive block, automation of the loading and unloading of disk drives onto the block is facilitated. Automation avoids the slow and laborious manual loading and unloading of the prior art. The disk drive and disk drive carrier are clamped together to the block. The servo writing may be for example of the self-servo writing type in which all servo tracks are written by the product head whilst the disk drive is clamped to the block, or may be of the servo fill type where only some of the servo tracks are written by the product head whilst the disk drive is clamped to the block.

In a preferred embodiment, the support assembly comprises a cage in which the block is mounted for relative reciprocating movement in a first direction, the cage having a space to receive the disk drive carrier, the clamp arrangement comprising an actuator that is operable to move the cage relative to the block so as to clamp a disk drive carried by the disk drive carrier to the block via the disk drive carrier. The use of the cage provides for a number of advantages, depending on the embodiment as will be discussed further below, including for example a simple clamping arrangement, a convenient mounting of the relatively massive block, and simple access for the loading and unloading of the disk drive carrier with disk drive.

The cage and block are preferably arranged so that the cage can move relative to the block only in said first direction. In this embodiment, the cage is constrained against moving in directions other than the first direction, which helps to minimise vibrations of the disk drive.

The actuator may comprise an inflatable actuator arranged between the block and the cage such that inflation of the inflatable actuator forces the cage to move relative to the block in the first direction. The inflatable actuator can be simply operated, for example by connection to a source of pressurised air with appropriate control valves, and can be arranged so that the clamping load is spread evenly over the disk drive carrier, even if there are variations in the height of clamping points for example. It will be appreciated that the clamping load can easily be varied by varying the air pressure.

The support assembly preferably comprises a biasing arrangement constructed and arranged to bias the cage in the direction opposite to the direction in which the cage is moved on operation of the actuator. In this embodiment, when the actuator is not operated (i.e. it is intended that the disk drive and carrier be released), the block moves to allow the disk drive carrier to be removed and another disk drive carrier to be inserted.

The cage is preferably supported by plural vibration-damping mounts. The vibration-damping mounts serve to damp vibrations arising from rotation of the disk during the servo writing process. In one preferred embodiment, the block is supported by exactly three vibration-damping mounts provided under the cage. By arranging the three vibration-damping mounts appropriately, the mounting of the block can be made to be relatively rigid and, moreover, the first vibrational mode of the block can be made to be rotational and of low frequency, which helps effective damping of vibrations arising from rotation of the disk.

The disk drive carrier preferably has plural clamps for clamping a disk drive to the disk drive carrier. Preferably, the plural clamps are arranged to clamp a disk drive via corresponding plural posts provided on a said disk drive and which pass from one surface to an opposed surface of a said disk drive. This provides for secure clamping of the disk drive.

The disk drive carrier may comprise plural disk drive carrier posts which pass through the disk drive carrier to bear against the block. The disk drive can be mounted on and supported by the carrier posts and thus is in contact with the block. This reduces the self-excitation effect of the block, which can act almost as though the carrier were not present.

In a preferred embodiment, the disk drive carrier comprises plural clamp arms and opposed disk drive carrier posts between which a disk drive can be clamped, the disk drive carrier posts passing through the disk drive carrier, the clamp arrangement being constructed and arranged to clamp a disk drive such that a lid of the cage bears against a first face of each of the clamp arms, a second face of each of the clamp arms bears against a first end of a respective one of a plurality of disk drive posts provided on a said disk drive and which pass from one surface to an opposed surface of a said disk drive, and a second end of each of said disk drive posts bears against an end of a respective one the disk drive carrier posts, the other end of the disk drive carrier posts bearing against the block.

According to a second aspect of the present invention, there is provided a clamp assembly for clamping a disk drive to a substrate, the clamp assembly comprising: a clamp arm, the clamp arm being translatable back and forth along a first direction and being pivotable about a pivot axis transverse to the first direction; a first biasing arrangement constructed and arranged to bias the clamp arm in the first direction towards a clamping position; a second biasing arrangement constructed and arranged to bias the clamp arm to pivot about the pivot axis; and, an actuator surface against which a clamp-release actuator can bear; the assembly being arranged such that the clamp arm is normally biased towards the clamping position and such that when a clamp-release actuator bears against the actuator surface, the clamp arm moves in the first direction away from the clamping position and pivots about the pivot axis.

The clamp assembly has particular application in the disk drive support assembly described above for use during servo writing, though it can be used in any application where a disk drive has to be clamped to another item, including for example in disk drive testing apparatus, data storage applications, etc. The clamp assembly may be provided on a disk drive carrier for clamping to a relatively massive block generally as describe above, or may be provided directly on a block so that the disk drive is directly clamped to a block. The clamp assembly allows a disk drive to be inserted and removed in a direction parallel to the first direction as the clamp arm can pivot out of the path of travel of the disk drive. This facilitates automation of loading and unloading of a disk drive. The clamp-release actuator is typically provided at the or each station at which a disk drive is loaded onto or removed from the substrate.

The first biasing arrangement may comprise at least one spring which is normally under compression. The or each spring of the first biasing arrangement may be a coil spring. The or each spring is easily interchanged with another spring of different strength, meaning that the clamp force can easily be set to be most appropriate to the circumstances.

The second biasing arrangement may comprise a leaf spring acting against an end of the clamp arm.

In a preferred embodiment, the clamp arm is pivotally mounted in a pivot block which is mounted for translational movement in the first direction in a housing. The housing preferably has a first surface that is generally parallel to the first direction, and a second, ramp surface at an angle to the first surface, the first and second surfaces acting to guide the translational and pivotal motion of the clamp arm. The pivot block and housing of this embodiment control the translational and pivotal movement of the clamp arm, and also facilitate the fitting together of the parts making up the clamp assembly.

According to a third aspect of the present invention, there is provided a clamp assembly for clamping a disk drive to a substrate, the clamp assembly comprising: a clamp element that is movable relative to the substrate, the clamp element having a projection for entering and engaging with an aperture in a disk drive, the clamp element further having a cam surface; the substrate having a cam surface corresponding to the cam surface of the clamp element; the arrangement being such that the clamp element is or can be withdrawn out of the path of travel of a disk drive to allow a said disk drive to be loaded onto or unloaded from the substrate, and such that the clamp element moves or can be moved into engagement with a said disk drive when a said disk drive is to be clamped to the substrate such that the projection on the clamp element enters an aperture in a said disk drive and such that the cam surfaces of the clamp element and the substrate engage each other to clamp a said disk drive to the substrate by engagement of the projection with a said aperture in a said disk drive.

The projection of the clamp assembly of this aspect engages with one of the fixing holes provided by convention in the side walls of a disk drive. (The position and size of these fixing holes are determined by an agreed standard.) Because of this engagement, the disk drive is held in a predetermined and therefore predictable position in the substrate, which facilitates automation of the loading and unloading process. Moreover, because of this engagement, the disk drive can be held securely in both a horizontal direction and a vertical direction. Historically, disk drives have been restrained only in the horizontal direction. However, with the increasing use of automation instead of manual loading and movement of the disk drives, vertical restraint is increasingly important. In addition, the relatively new small form factor disk drives (of 2.5" or approx. 6.35 cm diameter) are relatively light and, if not restrained vertically, are liable to bounce out of a carrier or the like in which they are mounted during transit between a loading/unloading station and a servo track writer station or the like. This is not so much of a problem with the conventional larger diameter disk drives (which have a diameter of 3.5" or approx. 8.9 cm). Also, the heavier conventional larger diameter disk drives tended to seat themselves properly in a substrate such as a disk drive carrier, whereas the newer small form factor disk drives are lighter in weight and therefore less likely to seat themselves properly without some external guidance. The cam surfaces provide for effective clamping as the clamp assembly moves into engagement with the disk drive. This arrangement avoids having to clamp the disk drive from above, and also avoids clamping using friction, which can result in excessively high forces being applied to the disk drive.

The clamp assembly preferably comprises a biasing arrangement for biasing the clamp element in its rest position towards the disk drive engagement position. This preferred arrangement means that in general the disk drive is held securely without any further external influence being required. The biasing arrangement may comprise a spring fixed at a first end with respect to the substrate and engaged at a second end with the clamp element.

In a preferred embodiment, the clamp element comprises a retraction post for engagement with a retraction device that is operable to withdraw the clamp element and thereby retract the projection of the clamp element from a said aperture of a said disk drive.

In a most preferred embodiment, the clamp assembly comprises a spring fixed at a first end with respect to the substrate and engaged at a second end with the clamp element for biasing the clamp element in its rest position towards the disk drive engagement position, the clamp element comprising a retraction post for engagement with the second end of the spring such that the spring is operable to withdraw the clamp element and thereby retract the projection of the clamp element from a said aperture of a said disk drive. The spring of this embodiment therefore serves the dual role of providing a bias to the clamp element and a mechanism for withdrawing the clamp element.

In an alternative arrangement, the clamp assembly comprises a biasing arrangement for biasing the clamp element in its rest position away from the disk drive engagement position.

It is preferred that the clamp element is able to move in three orthogonal directions. This best accommodates manufacturing tolerances in the clamp assembly and in the position of the fixing holes in the disk drive.

The clamp assembly preferably comprises four said clamp elements, the projection of each clamp element being engageable with a respective one of four apertures in a said disk drive.

According to a fourth aspect of the present invention, there is provided a clamp assembly for clamping a disk drive to a substrate, the clamp assembly comprising: a clamp spring mounted in a wall of the substrate and having a bearing portion that in the rest position of the spring projects through an aperture in the wall for engagement with a disk drive carried in use by the substrate; and, an actuator for withdrawing the bearing portion of the clamp spring to allow a said disk drive to be loaded onto or unloaded from the substrate.

The clamp assembly of this aspect can be arranged such that no clamp load is applied to the disk drive until desired, typically after electrical connections have been made to the disk drive, which is in contrast to some prior art arrangements. The clamp assembly can be arranged such that the disk drive is only clamped at the sides, thus avoiding having to clamp over the top of the disk drive. The clamp spring can be arranged such that it not only provides a clamping force but also operates to damp vibrations arising during rotation of the disk. The clamp assembly can be arranged so that operation of the actuator is achieved by moving the actuator back and forth in one direction only, resulting in simple operation.

In an embodiment, the actuator is a push rod which is connected at two positions to the clamp spring, the connection at a first of said positions being a fixed connection and the connection at the second of said positions being a sliding connection such that movement of the rod in a first direction moves the two connection points away from each other so as to withdraw the bearing portion of the clamp spring and movement of the rod in a second opposite direction allows the two connection points to move towards each other to cause the bearing portion of the clamp spring to move to a position at which it can engage a said disk drive carried in use by the substrate.

In an embodiment, two clamp springs are mounted in the wall of the substrate, each clamp spring having a bearing portion that in the rest position of the spring projects through an aperture in the wall for engagement with a disk drive carried in use by the substrate such that the two clamp springs engage the same side of a said disk drive. The actuator is preferably operable to withdraw the bearing portions of the two clamp springs simultaneously.

In a most preferred embodiment, the clamp assembly comprises two clamp springs mounted in the wall of the substrate, and comprises two clamp springs mounted in a second opposed wall of the substrate, each clamp spring having a bearing portion that in the rest position of the spring projects through an aperture in the wall for engagement with a disk drive carried in use by the substrate such that two of the clamp springs engage one side of a said disk drive and the other two clamp springs engage a second opposite side of a said disk drive, and comprising respective actuators for said two clamp springs and said two other clamp springs.

In an embodiment, the or at least one of the clamp springs has a projection for entering and engaging with an aperture in a disk drive.

According to a fifth aspect of the present invention, there is provided a clamp assembly for clamping a disk drive to a substrate, the clamp assembly comprising: a clamp element mounted in a wall of the substrate and having a bearing portion, the clamp element having a spring arm integrally formed therewith or attached thereto, the spring arm biasing the bearing portion to project through an aperture in the wall to a clamping position for engagement with a disk drive carried in use by the substrate.

Most conveniently, the clamp element can be formed integrally with the spring arm, and thus the whole of the clamp element can be made as a one-piece part. In the natural "rest" position, the clamp element is in its clamping position and does not require any external features to achieve clamping. This means that the clamp assembly can clamp a disk drive to the substrate even when the substrate is being moved around between stations or other fixtures. Nevertheless, a higher clamping load can be achieved at the station or other fixture where the disk drive is operated by engagement of a feature, such as a rod or projection provided at the station, with the spring arm to cause the spring arm to bias the bearing portion more forcefully.

Preferably, the bearing portion comprises a projection for entering and engaging with an aperture in a disk drive. The projection of the clamp assembly of this embodiment engages with one of the fixing holes provided by convention in the side walls of a disk drive. Because of this engagement, the disk drive is held in a predetermined and therefore predictable position in the substrate, which facilitates automation of the loading and unloading process. Moreover, because of this engagement, the disk drive can be held securely in both a horizontal direction and a vertical direction.

In a preferred embodiment, the spring arm is integrally formed or attached to the clamp element at one end only of the spring arm, the other end of the spring arm being engaged with the wall of the substrate such that the spring arm biases the bearing portion to project through an aperture in the wall for engagement with a disk drive carried in use by the substrate.

The clamp element preferably has an actuator surface against which a clamp-release actuator can bear to move the bearing portion away from the clamping position. The clamp-release actuator is typically provided at the or each station at which a disk drive is loaded onto or removed from the substrate.

According to a sixth aspect of the present invention, there is provided a disk drive carrier for carrying a disk drive, the disk drive carrier comprising: a casing; the casing having a first region for receiving a removable disk drive card that provides a data connection to a disk drive mounted in the carrier; the casing having a second region for receiving a removable motor card that provides an electrical connection to a motor of a disk drive mounted in the carrier; and, the casing having a third region for receiving a removable data and electrical connector which can be connected to a said removable motor card and removable disk drive card; whereby the disk drive carrier can be used to provide data and electrical connections to a disk drive carried by the carrier optionally: via a removable disk drive card, removable motor card and removable data and electrical connector received in the first, second and third regions respectively; or: via a product card of a said disk drive carried by the carrier.

The disk drive carrier can be used with different types of disk drive, including those that provide for electrical and/or data connections under the disk drive, those that provide for electrical and/or data connections at the rear of the disk drive, and those that have their own so-called product card associated therewith. It is only necessary to fit or remove the removable disk drive card, removable motor card and removable data and electrical connector as required depending on the type of disk drive. Moreover, the removable disk drive card, removable motor card and removable data and electrical connector can easily be swapped for different types depending on the precise model of disk drive. The disk drive carrier has particular application as the disk drive carrier of the disk drive support assembly described above for use during servo writing, though it can be used in any application where a disk drive has to carried to and, possibly, clamped to another item, including for example in disk drive testing apparatus, data storage applications, etc.

The disk drive carrier preferably comprises a biasing and laterally compliant arrangement for biasing a removable disk drive card received in the first region into engagement with a disk drive carried by the carrier. This biasing with lateral compliance helps to improve the connection and also allows for some tolerance variations that arise during manufacture. The biasing and laterally compliant arrangement is preferably removable from the carrier. The biasing and laterally compliant arrangement may be mounted on a tray which is removable from the disk drive carrier.

The disk drive carrier may comprise a cover that can be removed to allow insertion and removal of at least one of the removable disk drive card, removable motor card and removable data and electrical connector.

BRIEF DESCRIPTION OF THE DRAWINGS

Embodiments of the present invention will now be described by way of example with reference to the accompanying drawings, in which.

DETAILED DESCRIPTION

Figure 1:
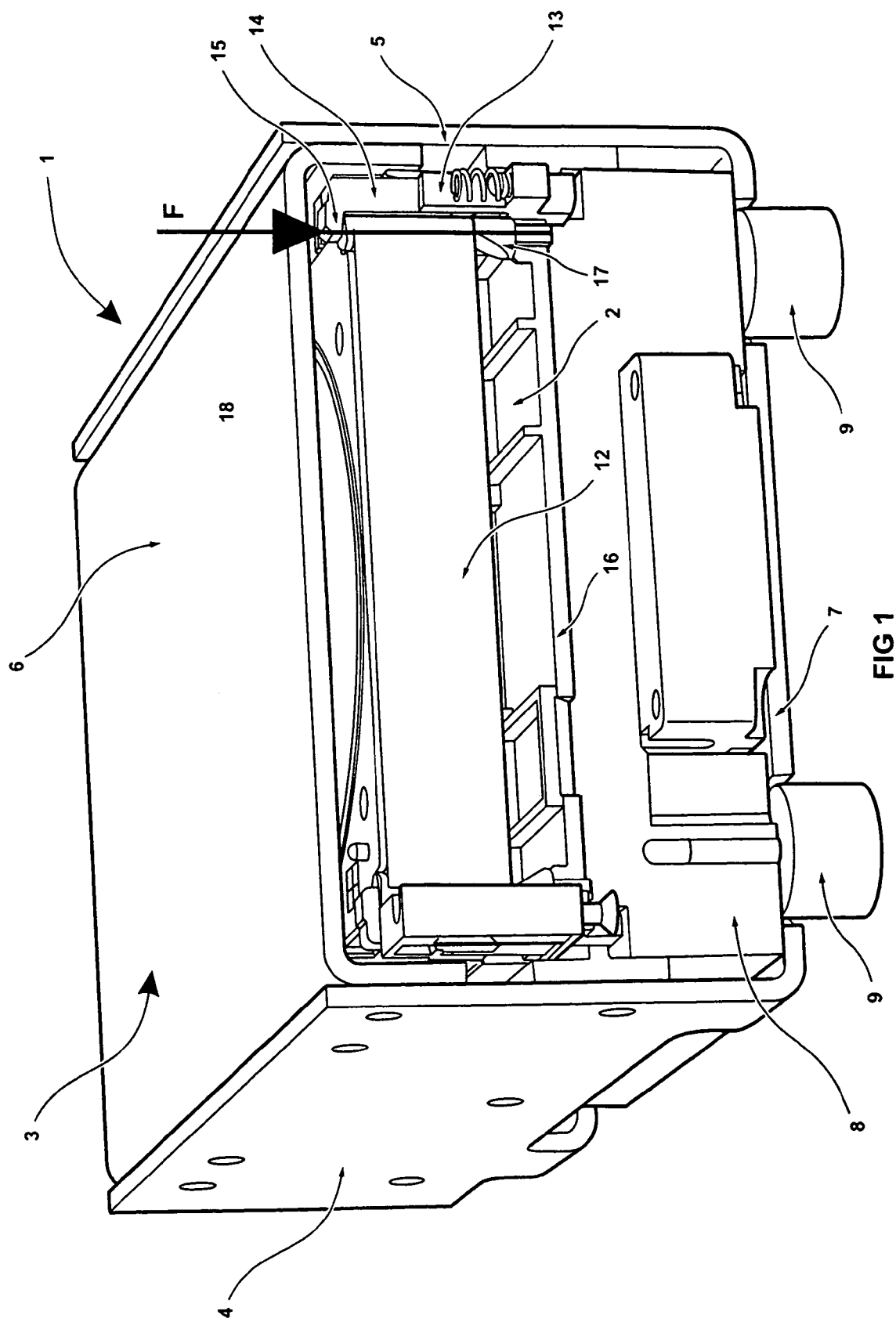
FIG. 1 is a perspective view from the front of an example of a disk drive support assembly in accordance with an embodiment of the present invention with a disk drive mounted therein, the front wall of the disk drive carrier being removed for clarity.
Figure 2:
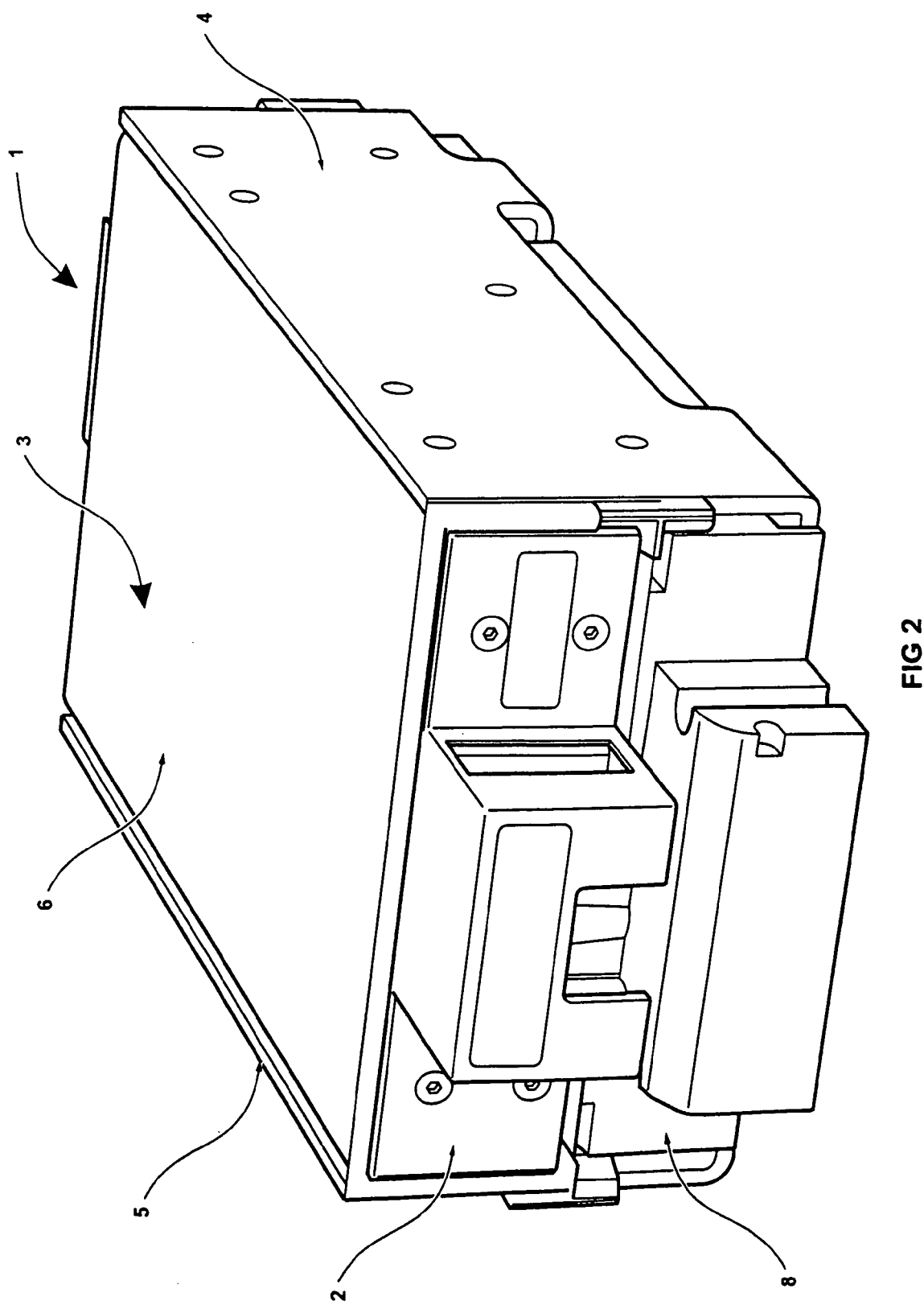
FIG. 2 is a perspective view from the front of the disk drive support assembly.
Figure 3:
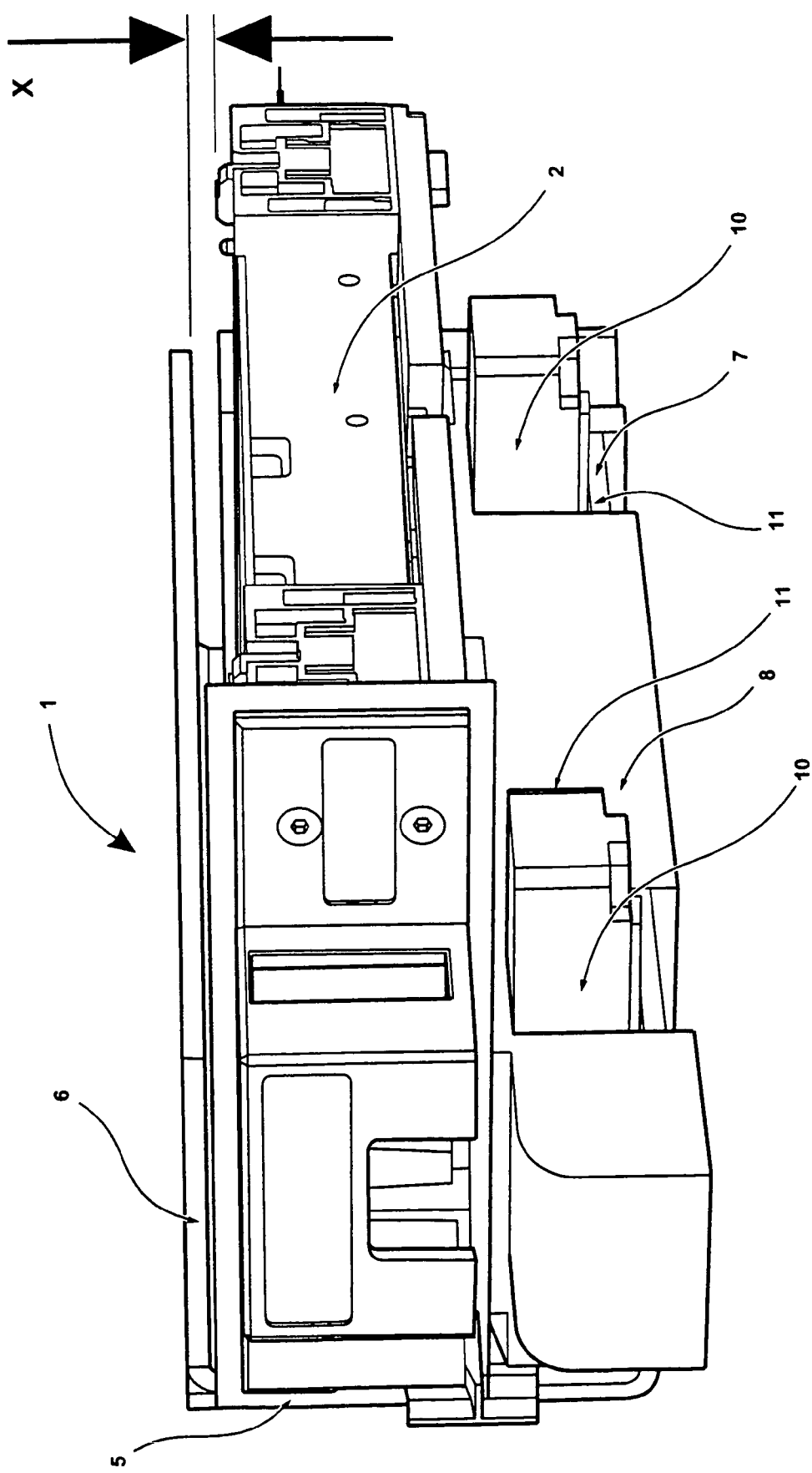
FIG. 3 is a perspective view of the disk drive support assembly in an unclamped position, with a side and part of the base of the cage and part of the relatively massive block removed for clarity.
Figure 4:
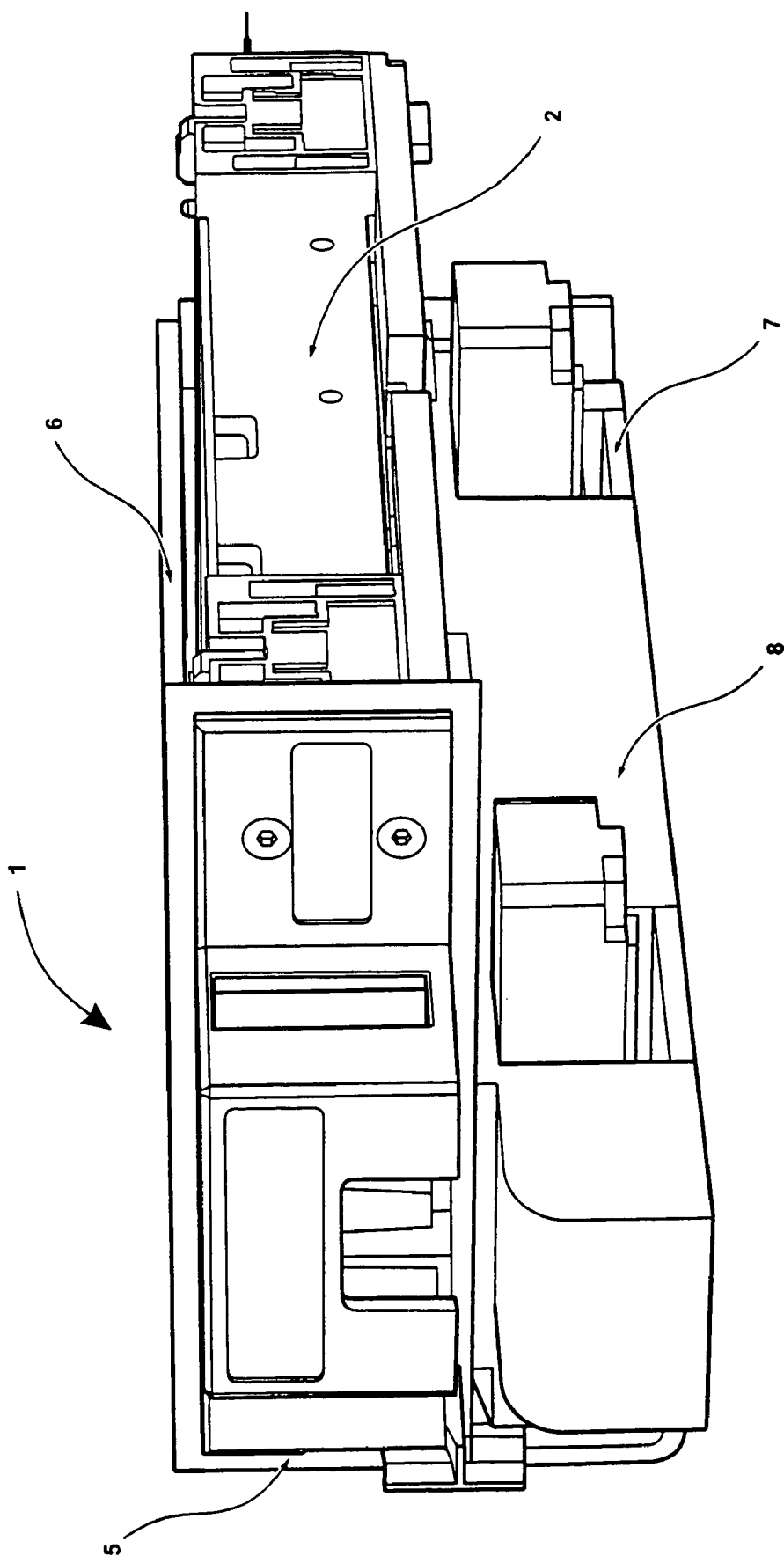
FIG. 4 is a view corresponding to FIG. 3 with the disk drive in the clamped condition.
Figure 5:
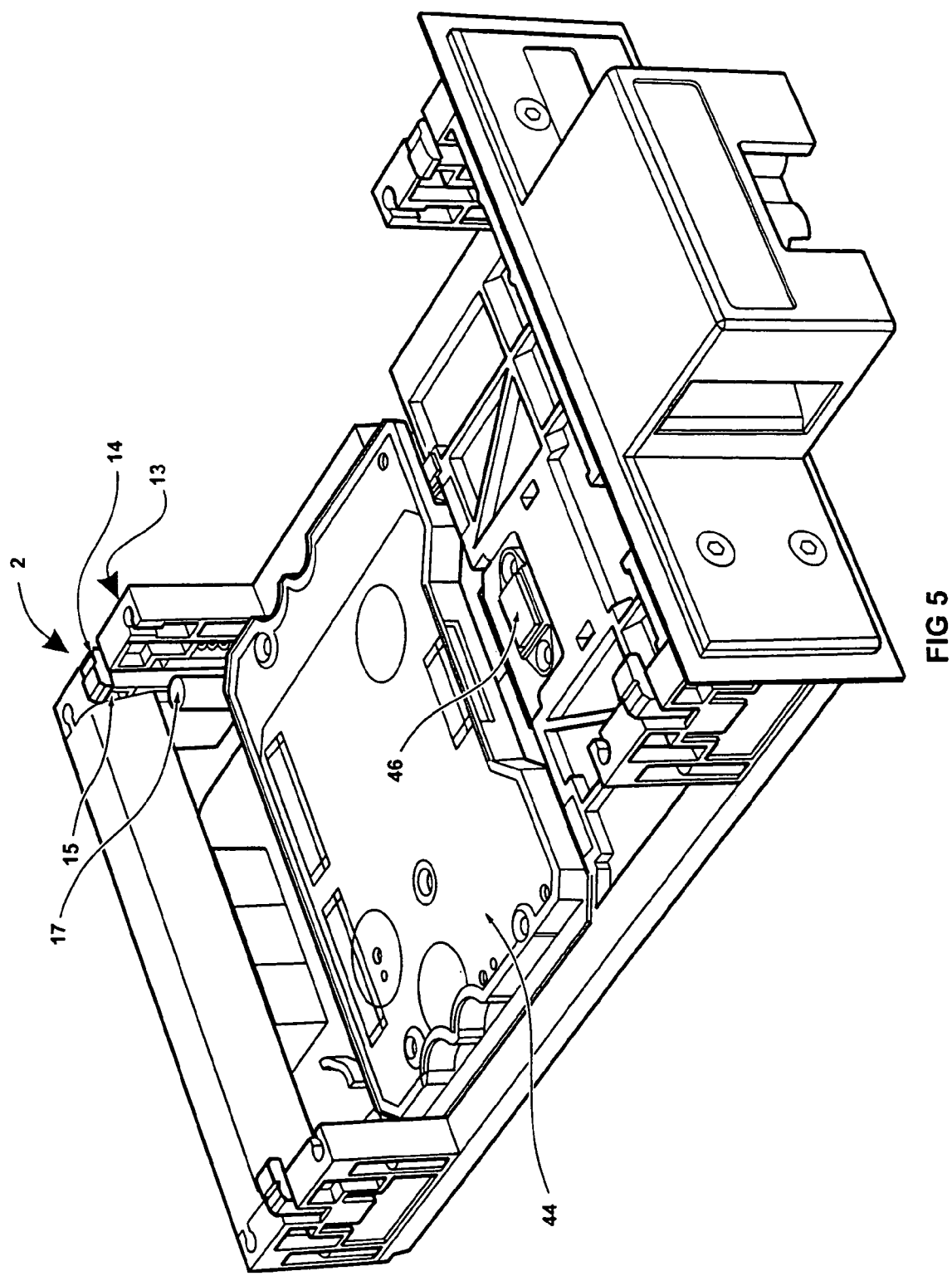
FIG. 5 is a perspective view of an example of a disk drive carrier in accordance with an embodiment of the present invention.

Referring initially to FIGS. 1 to 4, there is shown a disk drive support assembly 1 having a disk drive carrier 2 removably mounted therein. The assembly 1 has a housing or "cage" 3 which has two opposed sides 4,5, a lid 6 and a base 7. Mounted internally in the lower part of the cage 3 is a relatively massive block 8, which may be made of a high density material, such as steel or granite for example. The disk drive carrier 2 is received internally in the upper part of the cage 3.

The relatively massive block 8 is mounted on vibration-damping mounts 9 which pass through corresponding apertures (not shown) in the base 7 of the cage 3. The vibration-mounting mounts 9 are preferably made of an elastomeric material, such as Sorbothane (trade mark), which is preferably under some 20% compression. As will be discussed further below, the cage 3 may be mounted in a cell in a rack of plural cells. The mounting is such that the vibration-damping mounts 9 sit on the floor of the cell and such that the base 7 of the cage 3 is not in contact with the floor of the cell.

In a preferred embodiment, exactly three vibration-damping mounts 9 are used to support the block 8, the mounts 9 being arranged with two mounts 9 at the front corners of the assembly 1 and the third mount 9 mounted centrally at the rear of the assembly 1. It has been found that this arrangement causes the first vibrational mode of the block 8 to be rotational and, furthermore, of low frequency, such as 10 Hz, which makes for effective damping of vibrations arising from rotation of a disk drive mounted in the carrier 2 in use. However, in some embodiments, a different number of vibration-damping mounts 9 may be used, and/or the mounts 9 may be arranged in a different fashion. Other vibration-damping mechanisms may be used.

At least during the operative mode which will be discussed further below, the block 8 does not contact the base 7 of the cage 3. On the contrary, one or more inflatable actuators 10 are positioned between the base 7 of the cage 3 and the block 8 to lift the cage 3 off the block 8. These actuators 10 may be in the form of inflatable diaphragms, which are connected in use to a controllable source of pressurised air. Bearing in mind that it is the block 8 that is effectively sitting on the floor of the cell (via the vibration-damping mounts 9), inflation of the actuators 10 drives the base 7 of the cage 3 and therefore the cage 3 as a whole downwards. This action reduces the height of the space above the block 8 and below the lid 6 of the cage 3. The typical movement may be of the order of 4 mm or so. The actuators 10 are received in pockets 11 provided in at least one of the base 7 of the cage 3 and the block 8. A biasing arrangement (not shown), such as coil springs under compression, are provided between the upper surface of the block 8 and the lid 6 of the cage 3 in order to bias the cage 3 upwards so that in the normal, rest position, with the inflatable actuators 10 uninflated, the maximum gap between the block 8 and the lid 6 of the cage 3 is present.

The basic operation is as follows. The actuators 10 are allowed to deflate by removing the source of pressurised air. This allows the springs that bias the cage 3 upwards to push the cage 3 upwards relative to the block 8, which increases the space above the block 8. The drive carrier 2, with disk drive 12 mounted therein, is then inserted into the space above the block 8. The carrier 2 is pushed home so as to make appropriate electrical and data connections provided in at least one of the cage 3 and the cell in which the cage 3 is mounted. The clearance x between the top of the carrier 2 and the lid 6 of the cage 3 can be seen in FIG. 3. The actuators 10 are then inflated, which pushes the base 7 and therefore the whole of the cage 3 downwards, closing the gap between the top of the carrier 2 and the lid 6 of the cage 3, as shown most clearly in FIG. 4. Apart from their relative simplicity, the main advantage of using one or more inflatable actuators 10 is that the clamping load can be spread fairly evenly over the block 8 and cage 3, which accommodates variations in the size of the individual components of the assembly 1 which might arise during manufacture of these components.

The arrangement so far described permits the use of a carrier 2 to transport the disk drive in and out of the cage 3, which greatly facilitates automation of the loading and unloading process and avoids the need for low and laborious manual loading and unloading of the disk drive as in the prior art.

As can be seen in FIG. 1 and as will be discussed in more detail below, the disk drive carrier 2 has a clamp assembly 13 at each corner, each clamp assembly 13 having a clamp arm 14 which has a projecting lip 15 which projects inwardly of the carrier 2. The base 16 of the carrier 2 has a disk drive carrier post 17 at each corner opposed to the lip 15 of the corresponding clamp arm 14. The clamp arms 14 and disk drive carrier posts 17 are made of an incompressible material, such as steel. The disk drive carrier posts 17 pass through the base 16 of the carrier 2 so that when the carrier 2 is mounted in the cage 3, it is only these lower surfaces of the carrier posts 17 that are in contact with the upper surface of the block 8. Similarly, it is the upper surfaces of the clamp arms 15 that are the only contact point between the carrier 2 and the lid 6 of the cage 3. Moreover, the disk drive 12 is provided at each corner with a disk drive post 18. The ends of each disk drive post 18 are located at the upper and lower surfaces of the disk drive 12 and positioned so that they correspond to the position of the lip 15 of the clamp arms 14 and the posts 17 of the carrier 2.

Accordingly, as can be seen in FIG. 1, when the inflatable actuators 10 are inflated to lower the lid 6 of the cage 3 onto the carrier 2, the clamping force F between the block 8 and the cage 3 acts only through the incompressible materials of the clamp arm 14, disk drive posts 18 and disk drive carrier posts 17, and moreover acts in a line through these components. This means that no bending moment arises through any offset clamping arrangement and, moreover, the maximum clamping force is applied to the disk drive 12. In addition, the disk drive 12 is effectively clamped to the block 8 and is not for example clamped to the block 8 via the carrier 2 as such. Accordingly, the use of the carrier 2 does not affect the damping of vibrations by the block 8. The clamping force F applied to the disk drive 12 corresponds to the pressure applied though the inflatable actuators 10, which may be of the order of 6 Bar (approximately $6 \times 10^5$ Pa), less the spring force of the springs that bias the cage 3 upwards away from the block 8. The total clamping force may be of the order of 165 N per actuator 10, such that where two actuators 10 are provided, the total clamping force is about 330N. This may be increased if desired by using more actuators 10 and/or increasing the size of some or all of the actuators 10.

It will be understood that the disk drive carrier 2 described above has particular application in allowing a disk drive 12 to be clamped to a relatively massive block 8 for damping vibrations during servo writing. However, as mentioned above, the carrier 2 can be used in any application where a disk drive 12 has to be transported from one location to another as the carrier 2 provides a simple arrangement that can be manipulated by a robot or other automated machine.

The carrier 2 and the preferred clamp assemblies 13 will now be discussed in more detail with particular reference to FIGS. 5 to 10. The clamp arm 14 is pivotally mounted via a pivot pin 20 between two arms 21 of a pivot block 22, the pivot pin 20 defining a pivot axis of the clamp arm 14. The pivot block 22 is mounted in a housing or "tower" 23 and can slide up and down therein in a direction that is transverse to the pivot axis. The housing 23 is securely fitted to the base of the disk drive carrier 2, pegs 24 being provided on the base of the housing 23 for this purpose. The pivot block 22 is biased as a whole towards the base of the carrier 2 by one or more coil springs 25 which at one end are received over locating pegs 26 on the pivot block 22 and at the other end bear on an opposed surface 27 of the housing 23. The coil springs 25 can be selected to have an appropriate spring force, and may be exchanged for other coil springs of different spring force depending on the application and/or the particular type of disk drive to be carried by the carrier 2.

A leaf spring 28 is mounted on the pivot block to project upwardly between the two arms 21 so that the free end of the leaf spring 28 bears against the innermost side of the lower portion of the clamp arm 14. This therefore tends to bias the clamp arm 14 to pivot about the pivot axis to move the lip 15 of the clamp arm 14 outwardly of the carrier 2.

Figure 21:
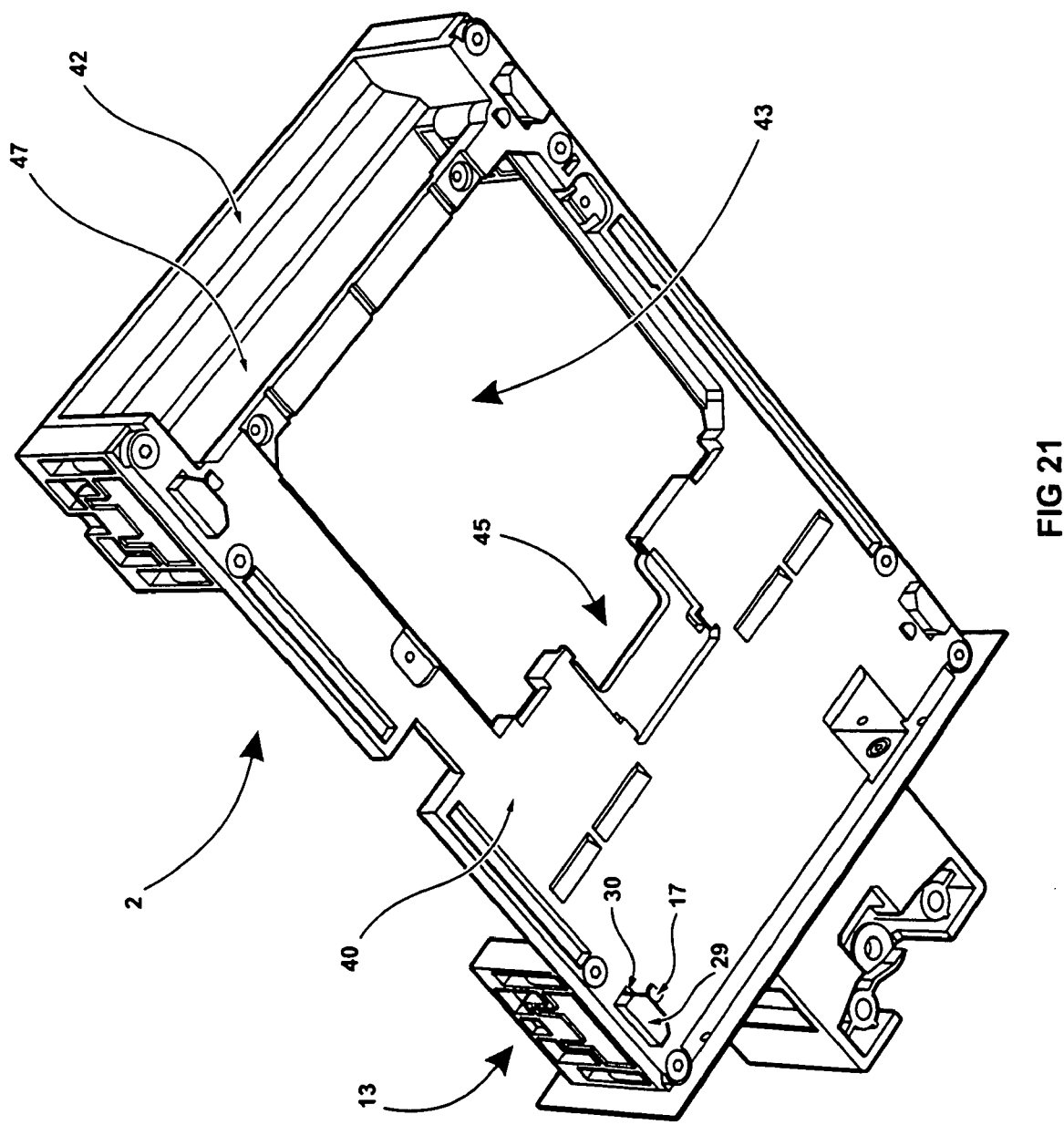
FIG. 21 is a perspective view from below of the disk drive carrier of FIG. 19 with all removable parts removed; and, FIG. 22 is a perspective view of the disk drive carrier of FIG. 19 from below to show the cover.
Figure 22:
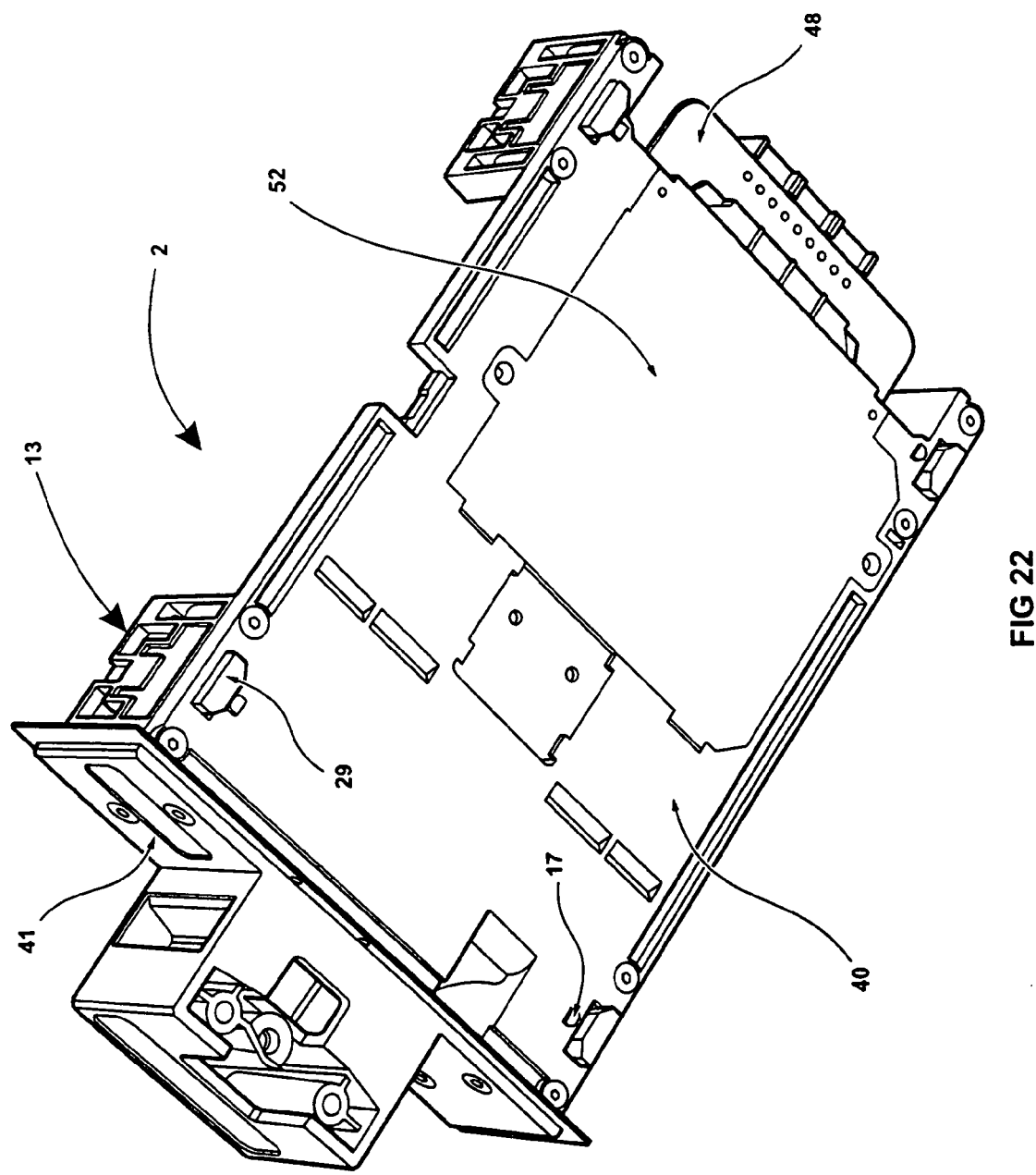

The pivot block 22 has at its lower end an actuator surface 29. The carrier 2 has at each corner an aperture 30 through which the actuator surface 29 of the pivot block 22 projects when the clamp assembly 13 is fixed to the carrier 2 (as can be seen in for example FIG. 21 discussed further below).

The clamp housing 23 has a planar back wall 31 which is parallel to the direction of translational movement of the clamp arm 14. The clamp housing 23 further has an angled or ramp wall portion 32 contiguous with the planar back wall 31 and angled upwardly and outwardly of the carrier 2.

Figure 6:
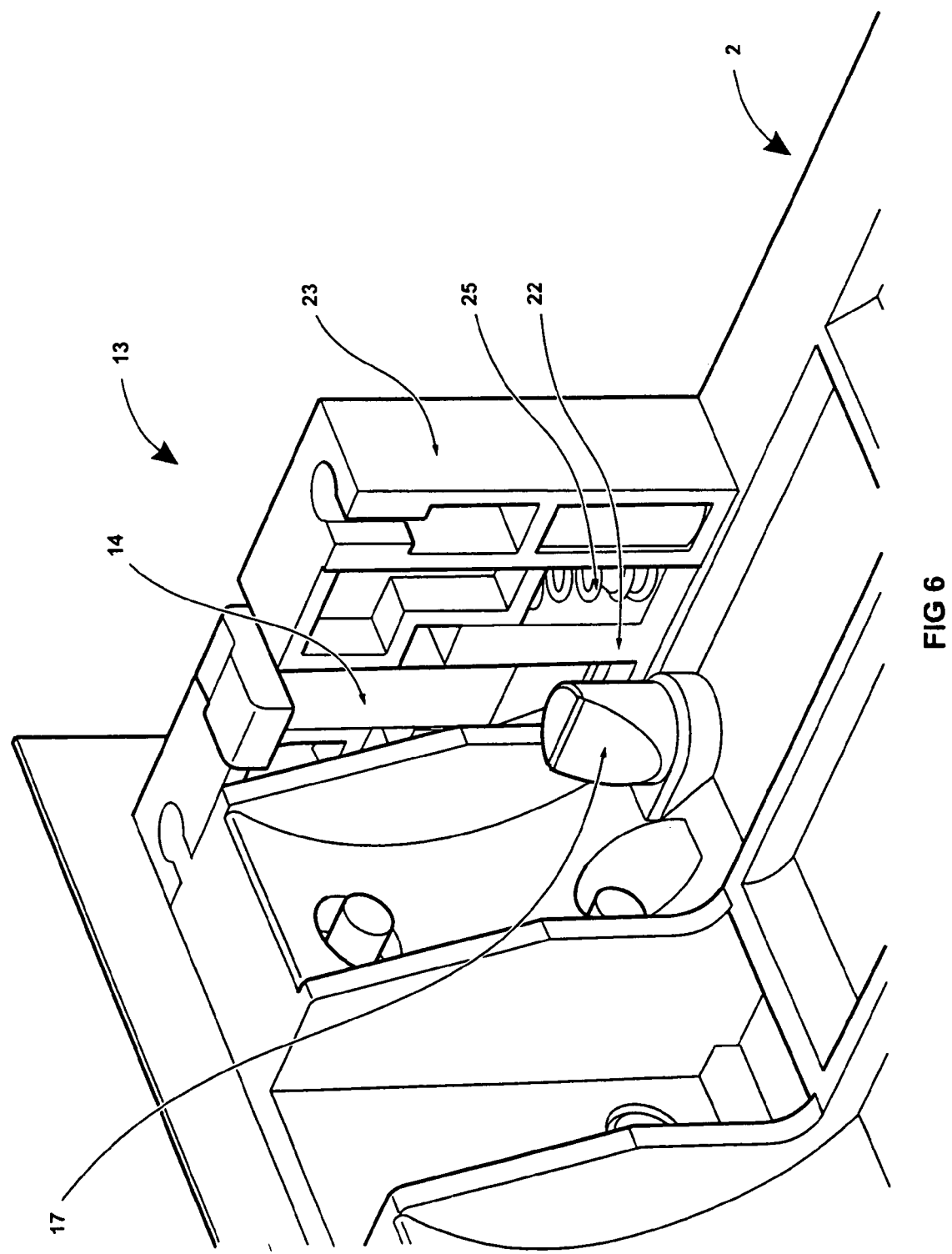
FIG. 6 is a detailed perspective view of the disk drive carrier showing particularly a portion of a first example of a clamp assembly in accordance with an embodiment of the present invention.
Figure 7:
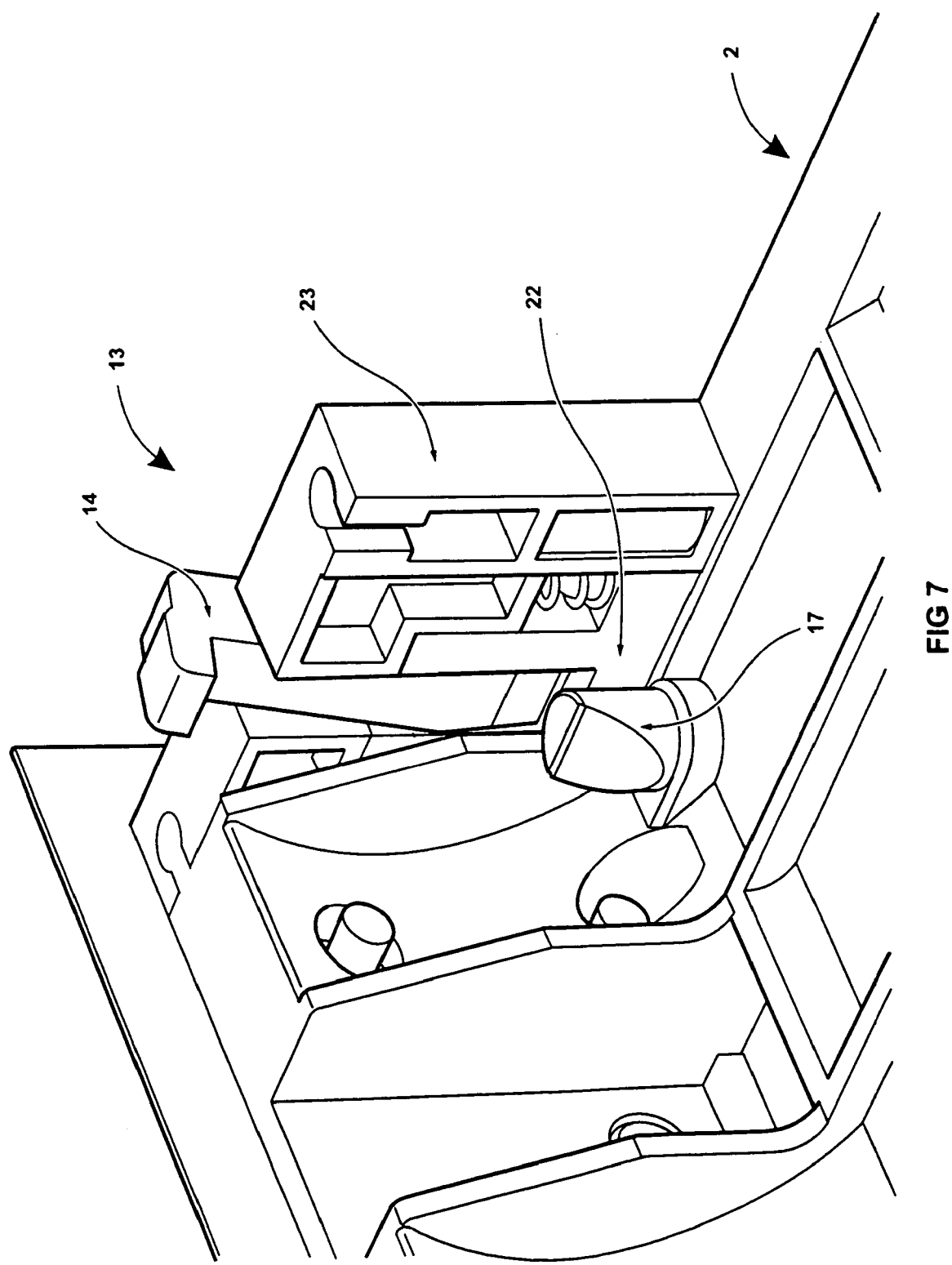
FIG. 7 is a perspective view corresponding to FIG. 6 with a clamp arm of the clamp assembly of FIG. 6 moved into an inoperative position.
Figure 8:
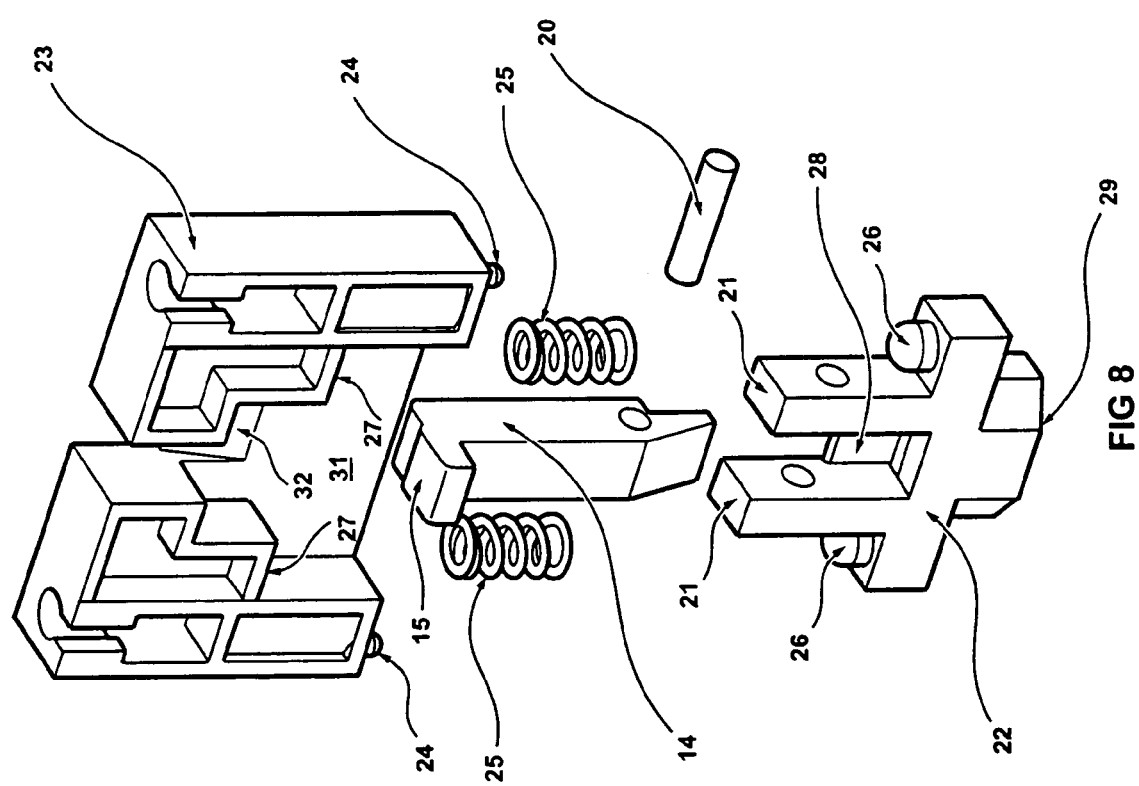
FIG. 8 is a perspective exploded view of the clamp assembly of FIG. 6.
Figure 9:
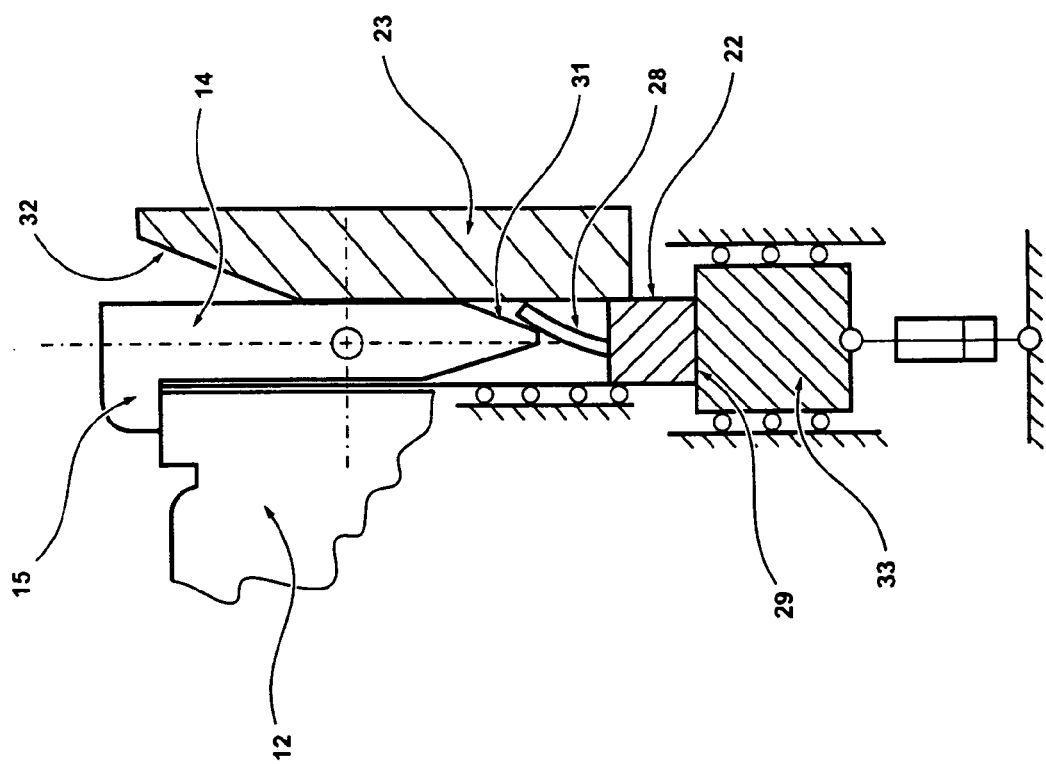
FIGS. 9 and 10 are partially sectioned side views showing the clamp assembly of FIG. 6 clamping and unclamped from a disk drive respectively.

In the rest position, shown for example in FIGS. 6 and 9, the coil springs 25 bias the pivot block 22 downwards. This biasing causes the back of the clamp arm 14 to rest against the planar back wall 31 of the housing 23. In this position, the lip 15 of the clamp arm 14 is positioned above the carrier post 17 such that a disk drive 12 can be clamped between the lip 15 and corresponding carrier post 17 at each corner of the carrier 2, the clamping force being provided by the coil springs 25.

In order to release the disk drive 12 from the carrier 2, the actuator surface 29 of each clamp assembly 13 is pushed upwards from underneath the carrier 2. As can be seen most clearly in FIG. 10, this pushes the whole pivot block 22 upwards, against the action of the coil springs 25. This causes the clamp arm 14 initially to move upwards, which moves the lip 15 upwardly of the disk drive 12. Once the pivot point of the arm 14 has moved to the junction between the planar surface 31 and the angled surface 32 of the housing 23, the leaf spring 28 bearing against the lower end of the clamp arm 14 causes the clamp arm 14 to pivot in order to move the lip 15 outwardly of the carrier 2. The angled surface 32 provides a back-stop for the pivoting movement of the clamp arm 14. Accordingly, at this unclamped state, the disk drive 12 can be lifted vertically out of the carrier 2 as the clamp arms 14 have been moved out of the path of movement of the disk drive 12. Another disk drive 12 can then be loaded into the carrier 2 and the pivot blocks 22 released so that the clamp arms 14 pivot inwardly and then downwardly of the carrier 2 to clamp the next disk drive 12 to the carrier 2.

Figure 10:
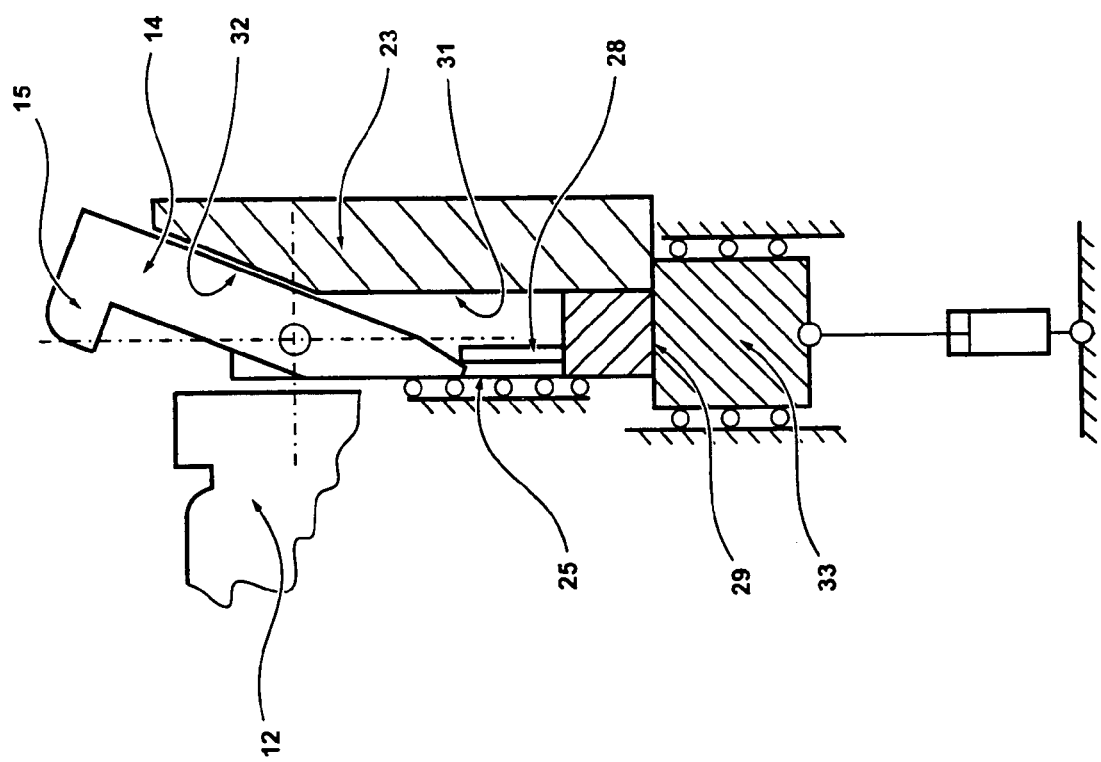
Figure 11:
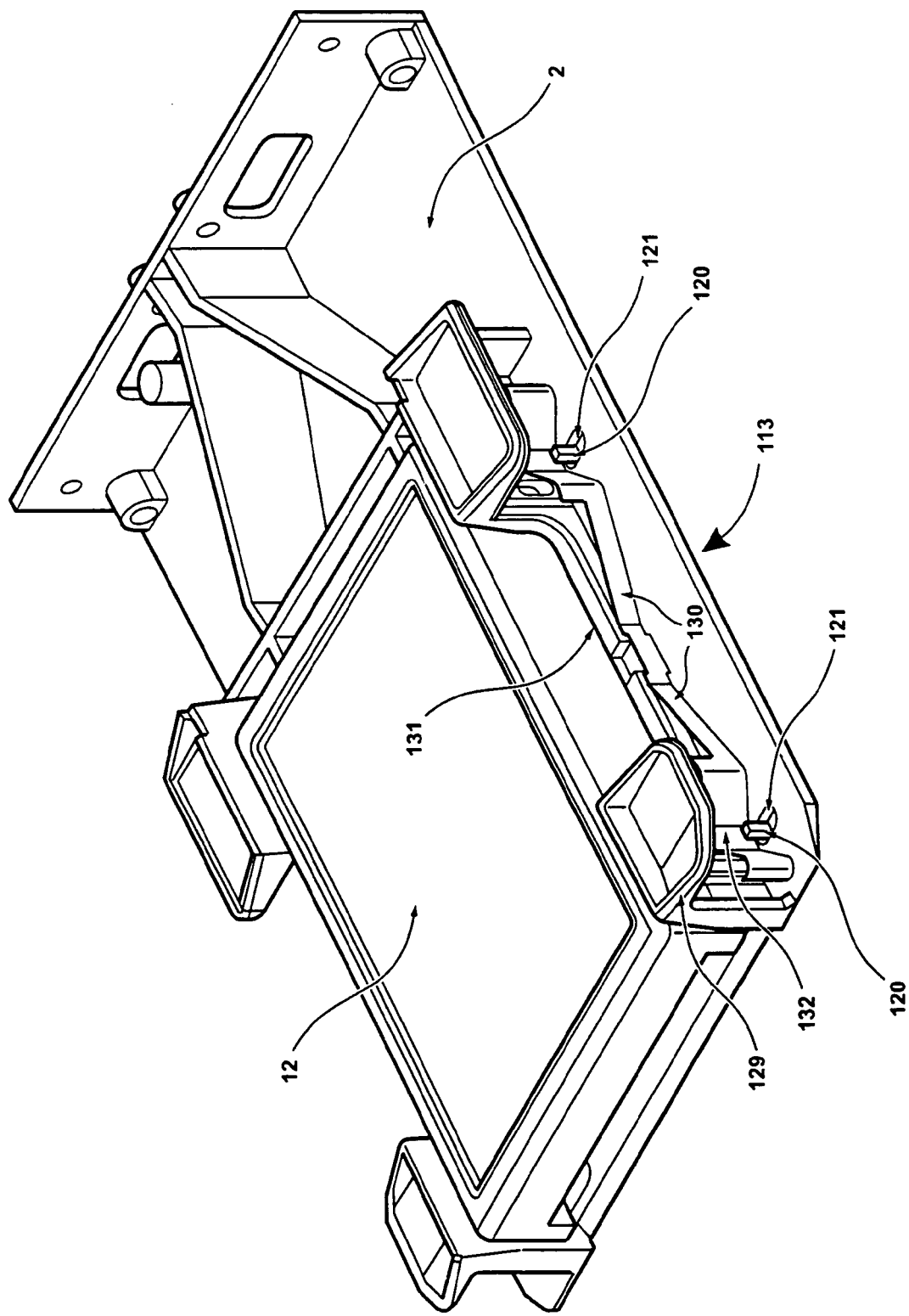
FIG. 11 shows a perspective view of a disk drive clamped to a disk drive carrier using a second example of a clamp assembly in accordance with an embodiment of the present invention.
Figure 12:
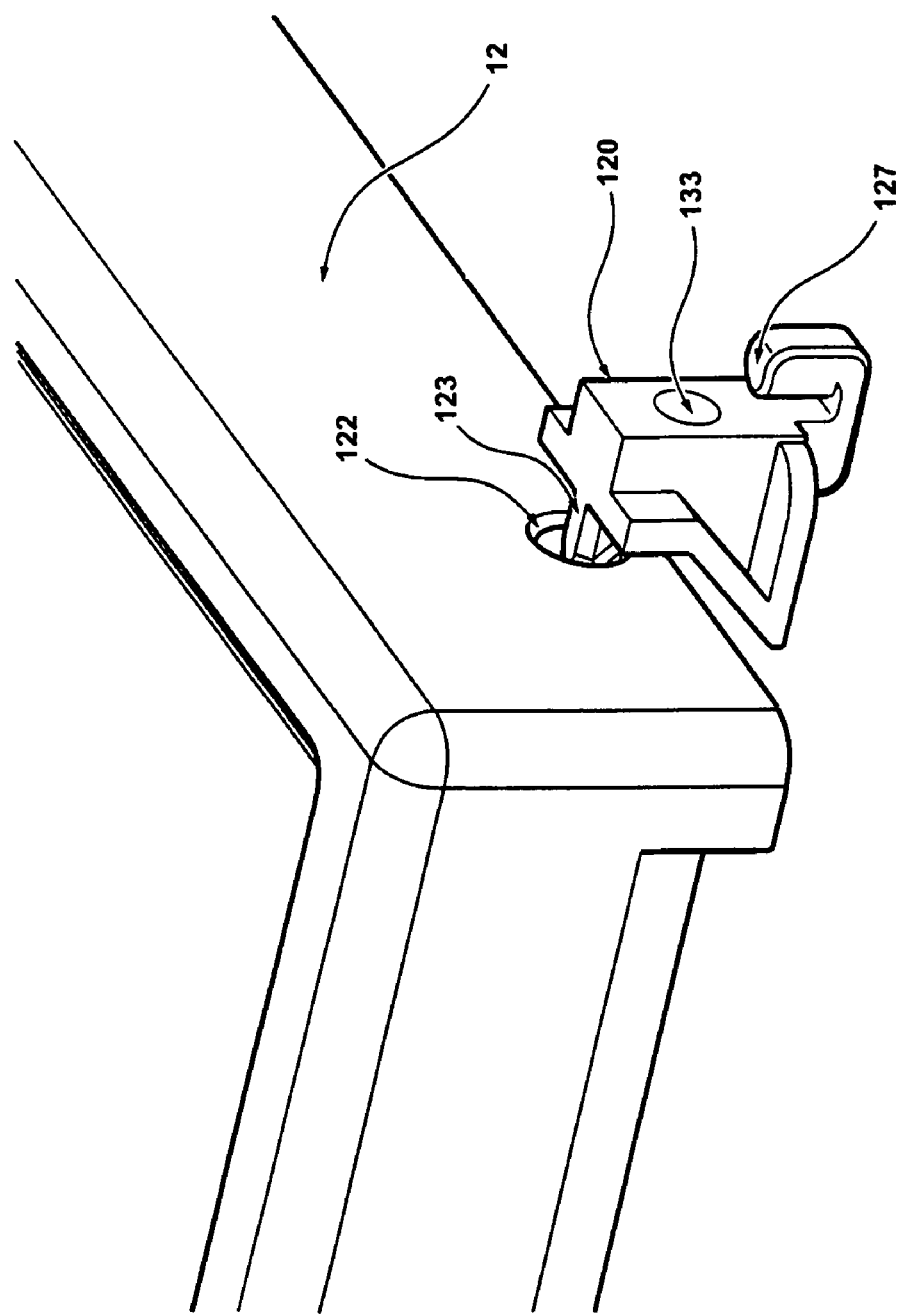
FIG. 12 shows a detailed view of a clamp of the clamp assembly of FIG. 11 engaged with a disk drive.

Accordingly, there is provided a simple clamp mechanism by which a disk drive 12 can be clamped to a carrier 2 in which the clamp arms 14 can be moved in a simple manner out of the preferred path of travel of the disk drive 12 during loading and unloading. Most conveniently, the present arrangement lends itself to automated loading and unloading of the disk drive 12. In FIGS. 9 and 10 there is shown schematically an actuator block 33, which may be spring-loaded, on a disk drive presenter station, the presenter station having four such actuator blocks 33, one for each clamp assembly 13. In an embodiment, a robot moves the carrier 2 to the presenter station and lowers it such that the actuator blocks 33 engage and push up on the actuator surfaces 29 of the pivot blocks 22 to release the clamp arms 14. When the robot lifts the carrier 2, the clamp arms 14 automatically move to their clamped state.

The clamp assembly 13 described above has particular application for clamping a disk drive 12 to a carrier 2, which in turn has particular application in transporting disk drives to and from apparatus such as disk drive testing apparatus, data storage apparatus and servo writing apparatus (whether servo writing is of the conventional type using an external clock head, of the self-servo writing type or of the servo fill type). Nevertheless, the clamp assembly 13 can be used in other applications to clamp a disk drive 12 to other apparatus. For example, the clamp assembly 13 can be used to clamp a disk drive 12 directly to a relatively massive block 8, without any disk drive carrier 2 being present.

Referring now to FIGS. 11 to 14, a second example of a clamp assembly 113 suitable for clamping a disk drive 12 to a disk drive carrier 2 or other substrate will now be described.

In this example, four clamp elements 120 are loosely mounted in respective slots or recesses 121 in the carrier 2. A clamp element 120 is provided for each of the fixing holes 122 which are conventionally provided in the so-called small form factor disk drives (which have a diameter of 2.5" or approx. 6.35 cm). The position and size of these fixing holes 122 are determined by an agreed standard. Each clamp element 120 has a projection 123 which enters the respective fixing hole 122 in the disk drive 12. The projection 123 is generally triangular in lateral cross-section so as to present an angled clamping face 124 which faces downwards and outwards in use and engages with the lowermost part of the chamfered periphery 125 of the fixing hole 122.

The clamp element 120 further has a cam surface 126 which is generally opposed to the clamping face 124 and which faces upwards and outwards. On the opposite side to the clamping face 124 and the cam surface 126, the clamp element 120 has an upstanding retraction post 127 which is spaced from the rear surface 128 of the clamp element 120.

Whilst only one, two or three clamp elements 120 may be sufficient, it is preferred that there be four such clamp elements 120. As mentioned, the clamp elements 120 are loosely fitted into respective slots or recesses 121 in the carrier 2. The clamp elements 120 are loosely retained in a vertical direction by overhanging portions 129 of the carrier 2, there being in general a gap between the top of the clamp element 120 and the overhanging portion 129 to allow some vertical movement of the clamp element 120.

In addition, to restrain the movement of the clamp elements 120 in a lateral direction across the disk drive 12 (to the left and right in FIG. 13), a biasing arrangement in the form of one or more elongate spring arms 130. There may be two spring arms 130 on each side of the carrier 2, or there may be a single but longer spring arm 130 on each side of the carrier 2. In the following discussion, it will be assumed that there are two spring arms 130 on each side of the carrier 2. At a first end 131 of each spring arm 130 on each side of the carrier 2, the spring arms 130 are fixed to the carrier 2. The other end 132 of each spring arm 130 is received in the space between the retraction post 127 and the rear face 128 of the respective clamp element 120. The rear face 128 of each clamp element 120 has an outwardly facing button 133 of part spherical shape against which the end 132 of the clamp arm 130 bears. This part spherical shape helps the clamp element 120 to adopt the proper position during clamping.

Figure 13:
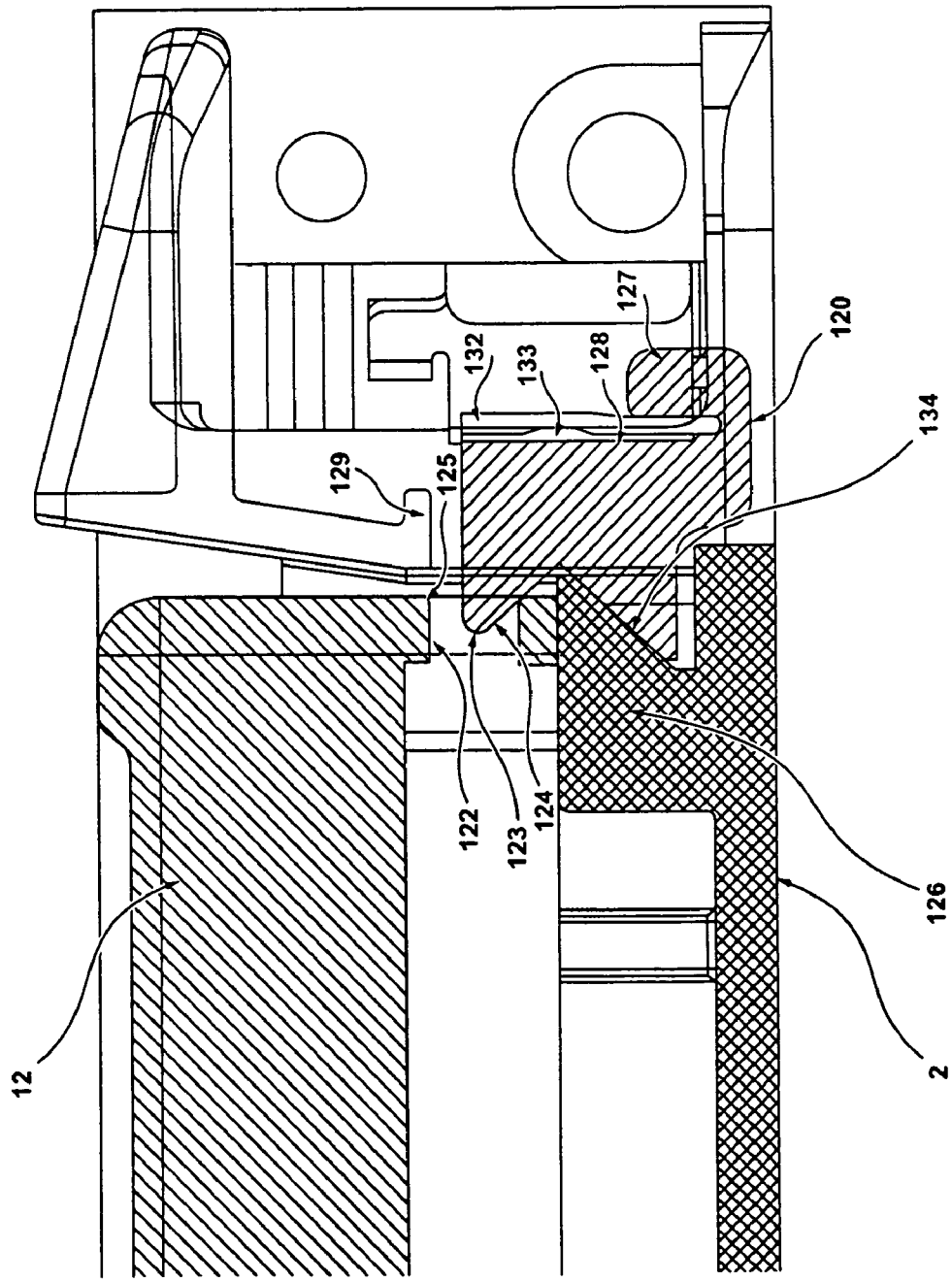
FIG. 13 shows a cross-sectional view of a clamp of the clamp assembly of FIG. 11 engaged with a disk drive.
Figure 14:
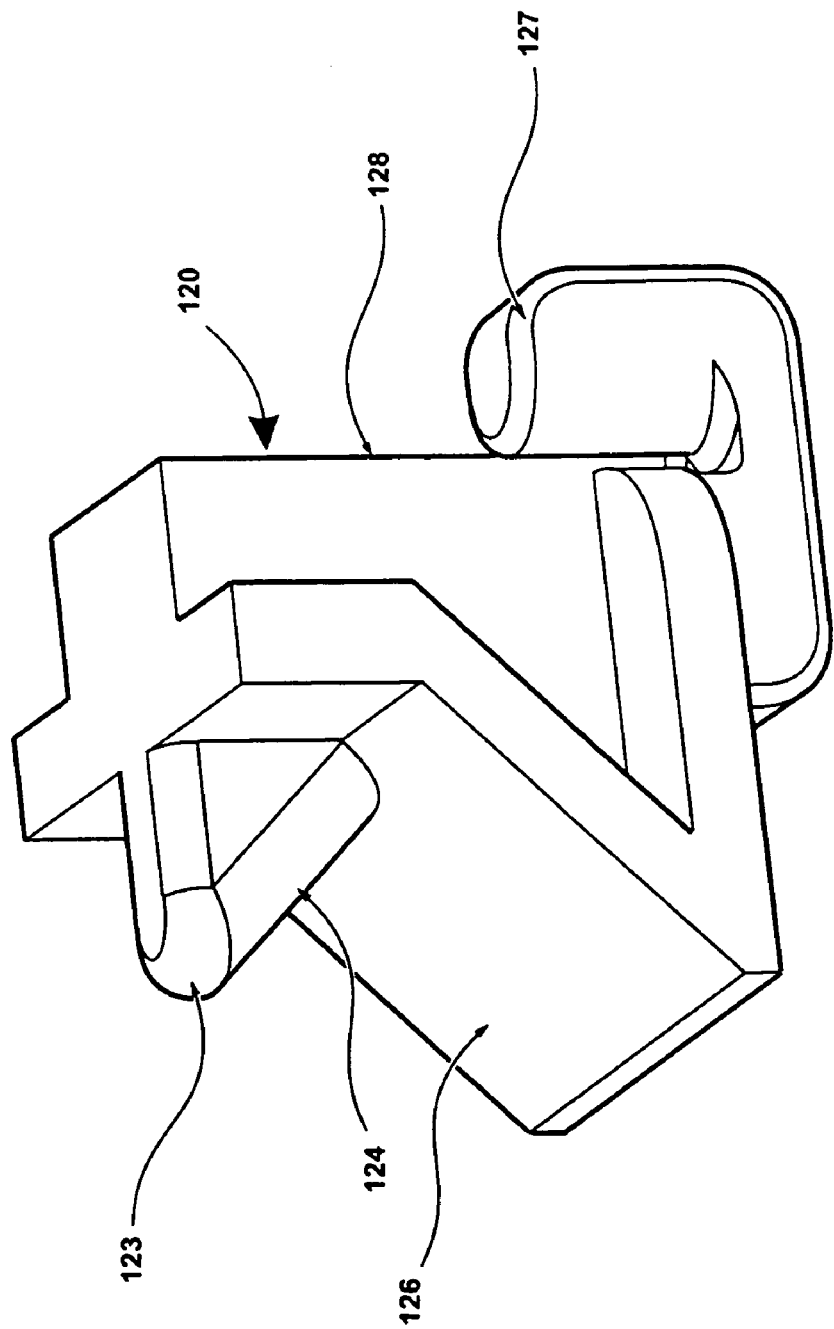
FIG. 14 shows another detailed view of a clamp of the clamp assembly of FIG. 11.

In use, the carrier 2 is loaded into a loading station or other fixture at which a disk drive is to be loaded into the carrier 2. In the station, arms or other features (not shown)

engage either the spring arms 130 or the retraction posts 127 directly to withdraw the clamp elements 120 (i.e. to move the clamp elements 120 to the right in FIG. 13). This moves the projections 123 of the clamp elements 120 out of the path of travel of the disk drive 12. The disk drive 12 can then be inserted into the carrier 2. The clamp elements 120 are then released and, under the bias provided by the spring arms 130, the clamp elements 120 move inwards. This causes the projections 123 on the clamp elements 120 to enter the respective fixing holes 122 in the disk drive 12. At the same time, the cam surfaces 126 on the clamp elements 120 engage corresponding cam surfaces 134 provided on the carrier 2. As can be seen most clearly in FIG. 13, this engagement of the respective cam surfaces 126,134 provides a wedging action that drives the clamping face 124 of the clamp elements 120 downwards against the lowermost chamfered surface 125 of the fixing holes 122 as the spring arms 130 drive the clamp elements 120 inwards. The disk drive 12 is thus securely clamped to the carrier 2.

The carrier 2 can then be lifted from the station with the disk drive 12 clamped to the carrier 2. It will be immediately appreciated that the engagement of the projections 123 of the clamp elements 120 with the fixing holes 122 in the disk drive 12 provide for both vertical and horizontal restraint of the disk drive 12. The disk drive 12 can therefore be safely transported around in the carrier 2 without bouncing out of the carrier 2. Moreover, the position of the disk drive 12 relative to the carrier 2 is fixed to a high degree of certainty, which facilitates the making of electrical connections or the like to the disk drive 12 at a station (such as a servo track writer or test rack or storage rack or the like).

It is preferred that the spring arms 130 be of a damped or so-called constrained layer type. This may be achieved by making the spring arms 130 of a laminate of two relatively rigid materials (such as metal or plastics) between which is sandwiched a more flexible material, which may simply be an adhesive. This arrangement provides for good damping of vibrations in addition to the good clamping force provided by the spring arms 130 acting on the clamp elements 120.

Whilst the spring arms 130 have been described as tending to bias the clamp elements 120 inwards towards their clamping position, in some circumstances the spring arms 130 may be arranged to bias the clamp elements 120 outwards away from their clamping position. Some other arrangement is provided to drive the clamp elements 120 inwards towards the clamping position when desired.

Figure 15:
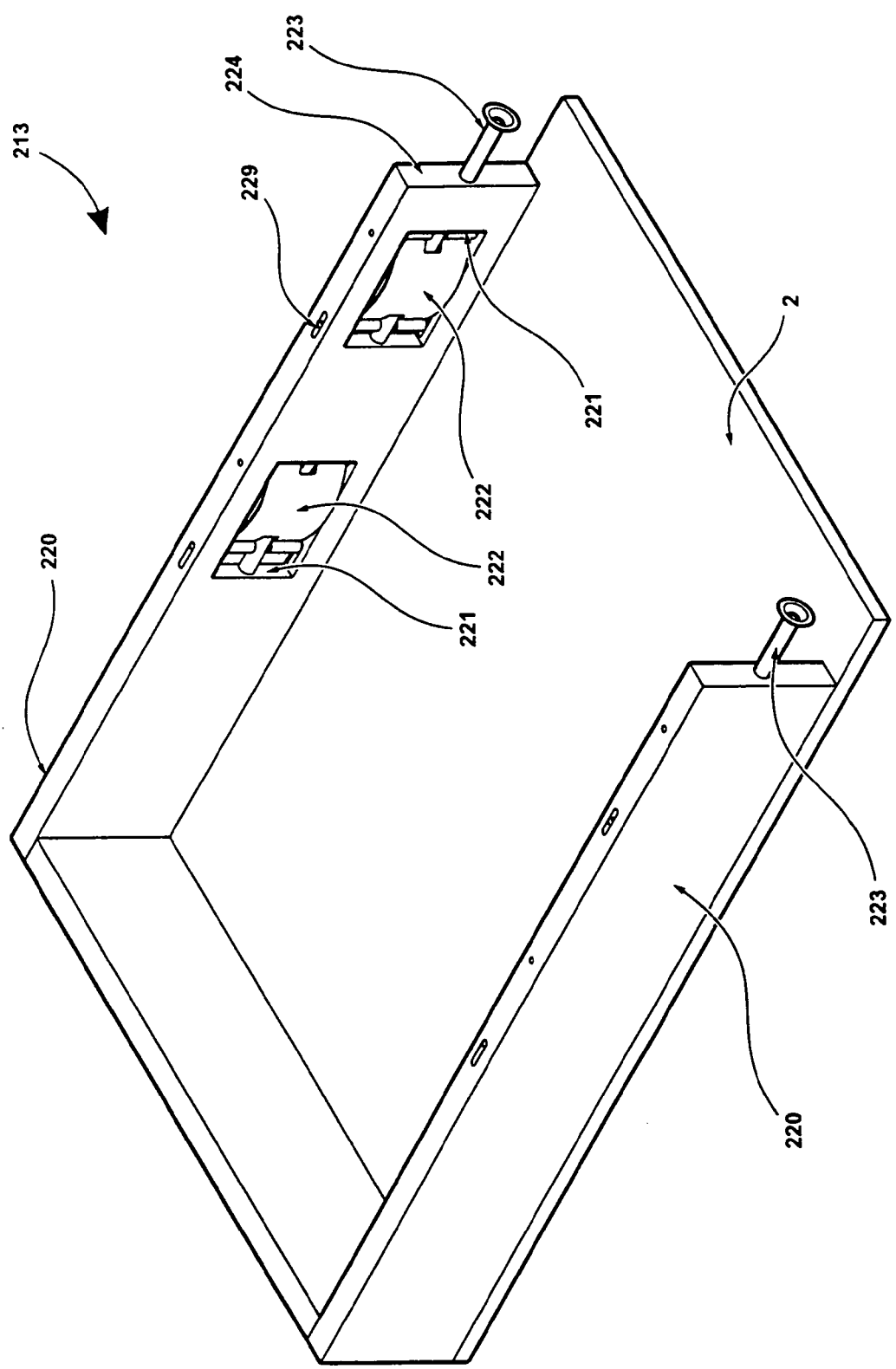
FIG. 15 shows a perspective view of a disk drive carrier using a third example of a clamp assembly in accordance with an embodiment of the present invention.
Figure 16:
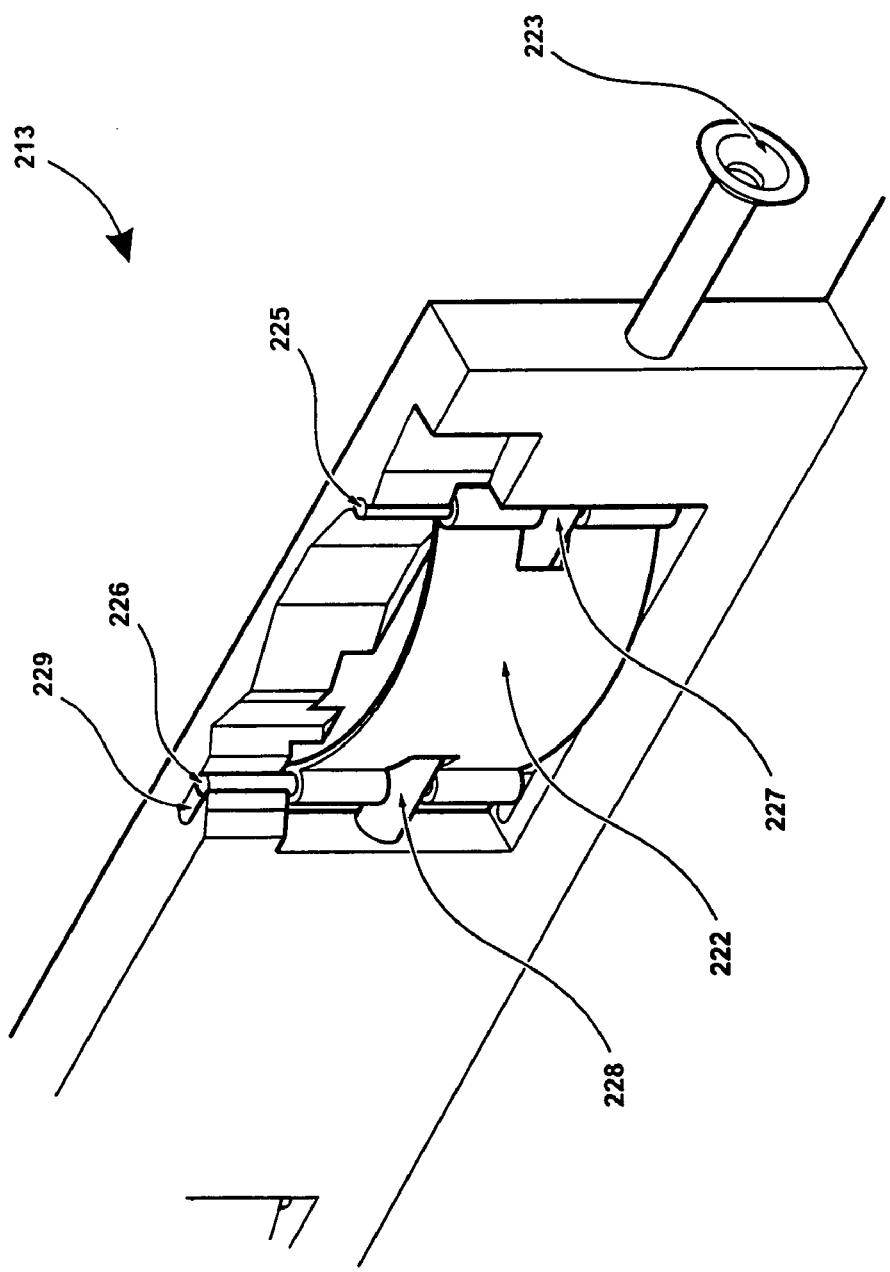
FIG. 16 shows a detailed view of a portion of the clamp assembly of FIG. 15 with a part of the side wall of the carrier cut away for clarity.

Referring now to FIGS. 15 and 16, a third example of a clamp assembly 213 suitable for clamping a disk drive 12 to a disk drive carrier 2 or other substrate will now be described.

In this example, the disk drive carrier 2 (or other substrate) has upstanding side walls 220 in each of which are two inwardly facing openings 221. A clamp spring 222 is mounted in each opening 221. Each clamp spring 222 is again preferably of the damping or constrained layer type. This may be achieved by making the clamp springs 222 of a laminate of two relatively rigid materials (such as metal or plastics) between which is sandwiched a more flexible material, which may simply be an adhesive. This arrangement provides for good damping of vibrations in addition to the good clamping force provided by the clamp springs 222.

The following description will be given in respect of one of the side walls 220, it being understood that the arrangement for the other side wall 220 is the same. An actuator 223 in the form of a push rod passes through an end face 224 of the side wall 220 into the side wall 220, and is connected at two positions via respective pins 225,226 to each clamp spring 222. Each pin 225,226 is fixed relative to their respective clamp springs 222. The first pin 225 is fixed in and relative to the side wall 220 and passes through a short elongate slot 227 in the actuator 223. Accordingly, when the actuator 223 slides back and forth within the side wall 220, the first pin 225 remains fixed in its position in the side wall 220 and moves relatively along the elongate slot 227 in the actuator 223. The second pin 226 is fixed relative to the actuator 223, for example by passing through a narrow aperture 228 in the actuator 223 of a diameter close to the diameter of the second pin 226. The second pin 226 can slide relative to the side wall 220 by virtue of a short elongate slot 229 in the side wall 220. Thus, as the actuator 223 moves back and forth in the side wall 220, this movement carries the second pin 226 back and forth.

In the rest position of the clamp springs 222 shown in the drawings, the clamp springs 222 bow inwardly into the body of the carrier 2. The clamp springs 222 are extended towards a more planar form simply by pushing the actuators 223 inwards towards the side walls 220. This movement forces the second pins 226 away from their respective first pins 225, which tends to flatten the clamp springs 222 and thus draws the clamp springs 222 outwardly and away from the body of the carrier 2. When the clamp springs 222 have been sufficiently withdrawn, a disk drive can be loaded onto the carrier 2. The actuators 223 are then released, allowing the clamp springs 222 to relax to their bowed rest position at which they clamp the disk drive by friction. The disk drive can be released by again pushing in the actuators 223, thus withdrawing the clamp springs 222. The actuators 223 are operated by push rods or similar provided at the station or other fixture at which the disk drive is loaded and/or unloaded.

This arrangement provides for zero clamp force when a disk drive is loaded onto or unloaded from the carrier 2. Each clamp spring 222 operates independently of the other clamp springs 222, thus providing optimum clamp loads. There is a simple single direction for operation of the actuators 223. This arrangement is particularly suitable for automated loading and unloading of the disk drives.

Whilst the clamp springs 222 in the example shown clamp the disk drive only by friction, one or more, and preferably all, of the clamp springs 222 may have a projection or button for engagement with one or more of the fixing holes provided by convention in the side walls of a disk drive, the projection or button being similar to the projections 328 of the example discussed below with reference to FIGS. 17 and 18. (The position and size of these fixing holes are determined by an agreed standard.) Because of this engagement, the disk drive is held in a predetermined and therefore predictable position in the substrate, which facilitates automation of the loading and unloading process. Moreover, because of this engagement, the disk drive can be held securely in both a horizontal direction and a vertical direction. The engagement with the disk drive may therefore be by friction only, by a combination of friction and mechanical engagement of the projection(s) with the fixing hole(s) in the disk drive, or solely by the mechanical engagement of the projection(s) with the fixing hole(s) in the disk drive.

Figure 17:
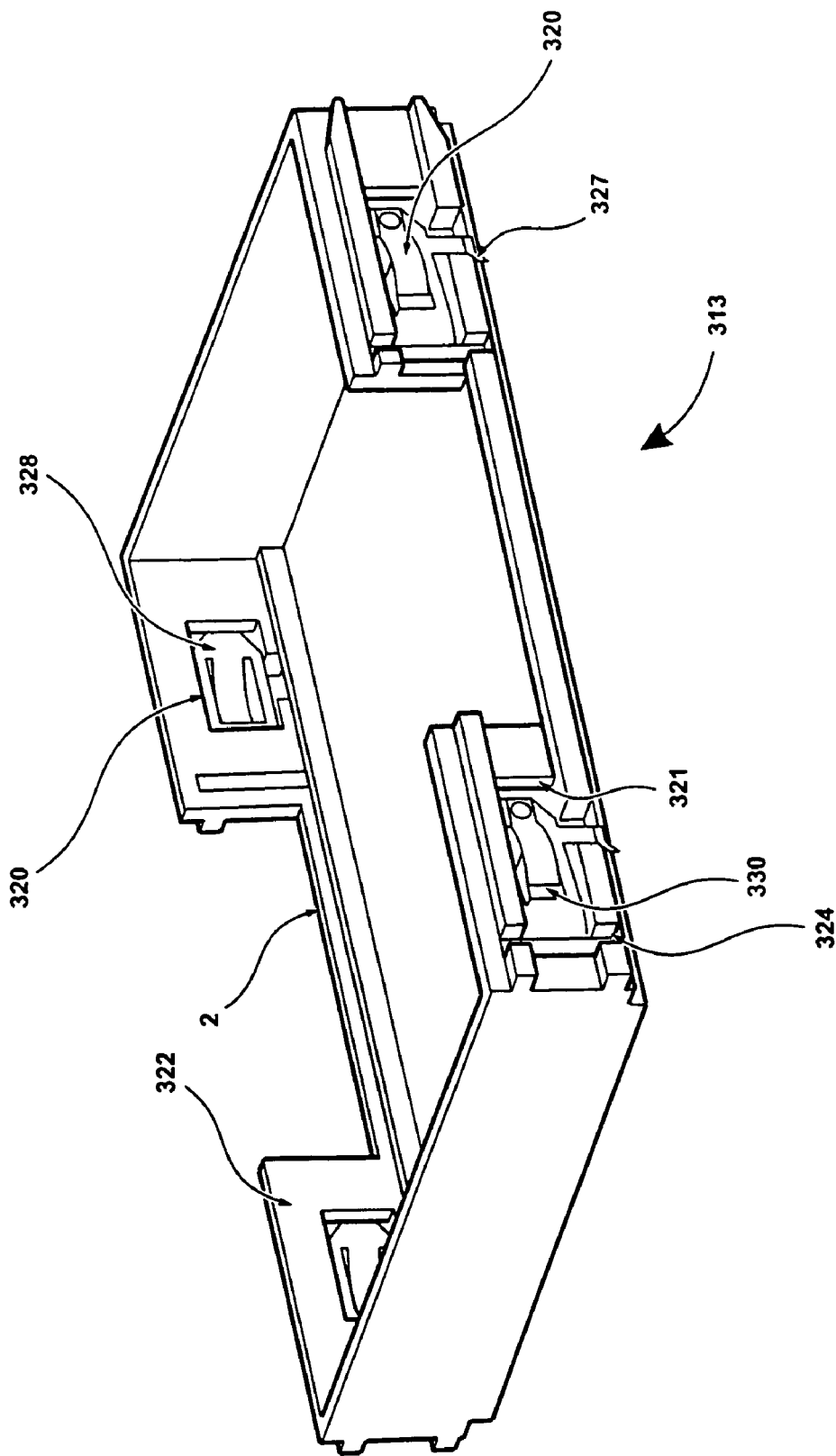
FIG. 17 shows a perspective view of a disk drive carrier using a fourth example of a clamp assembly in accordance with an embodiment of the present invention.
Figure 18:
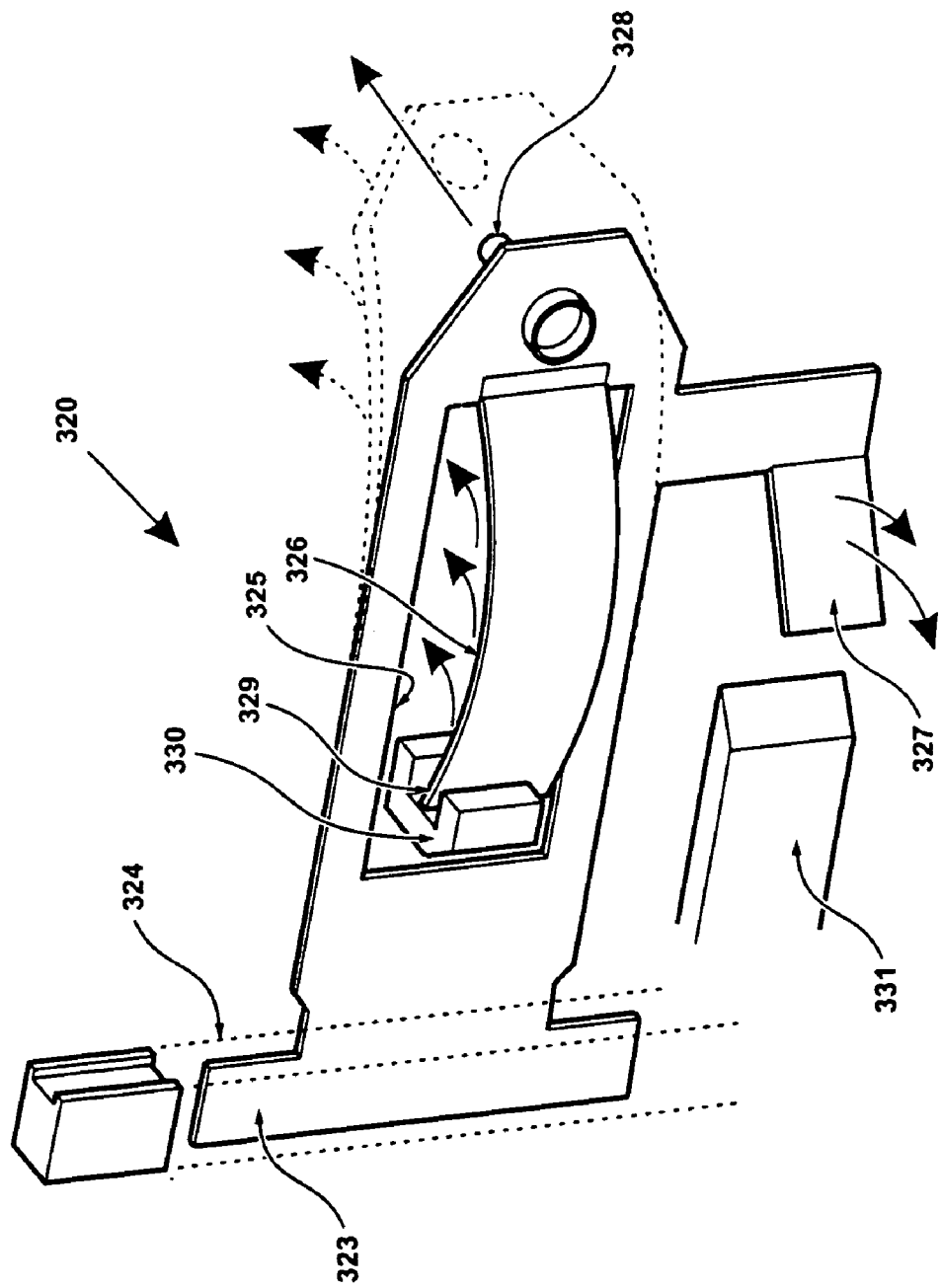
FIG. 18 shows a detailed view of a clamp of the clamp assembly of FIG. 17, the clamp being shown in a loaded configuration.
Figure 19:
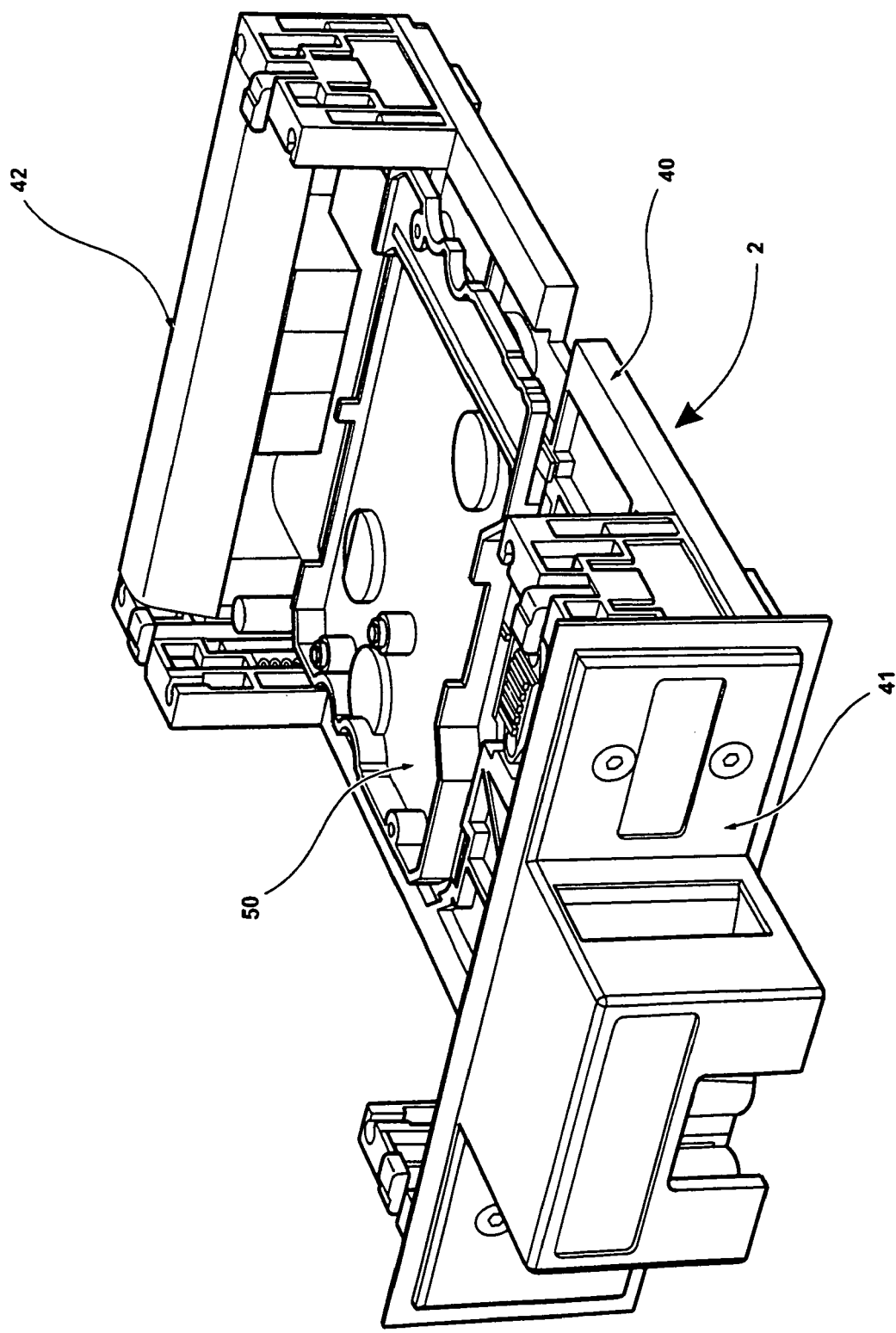
FIG. 19 is a perspective view of a disk drive carrier with a disk drive card removed.
Figure 20:
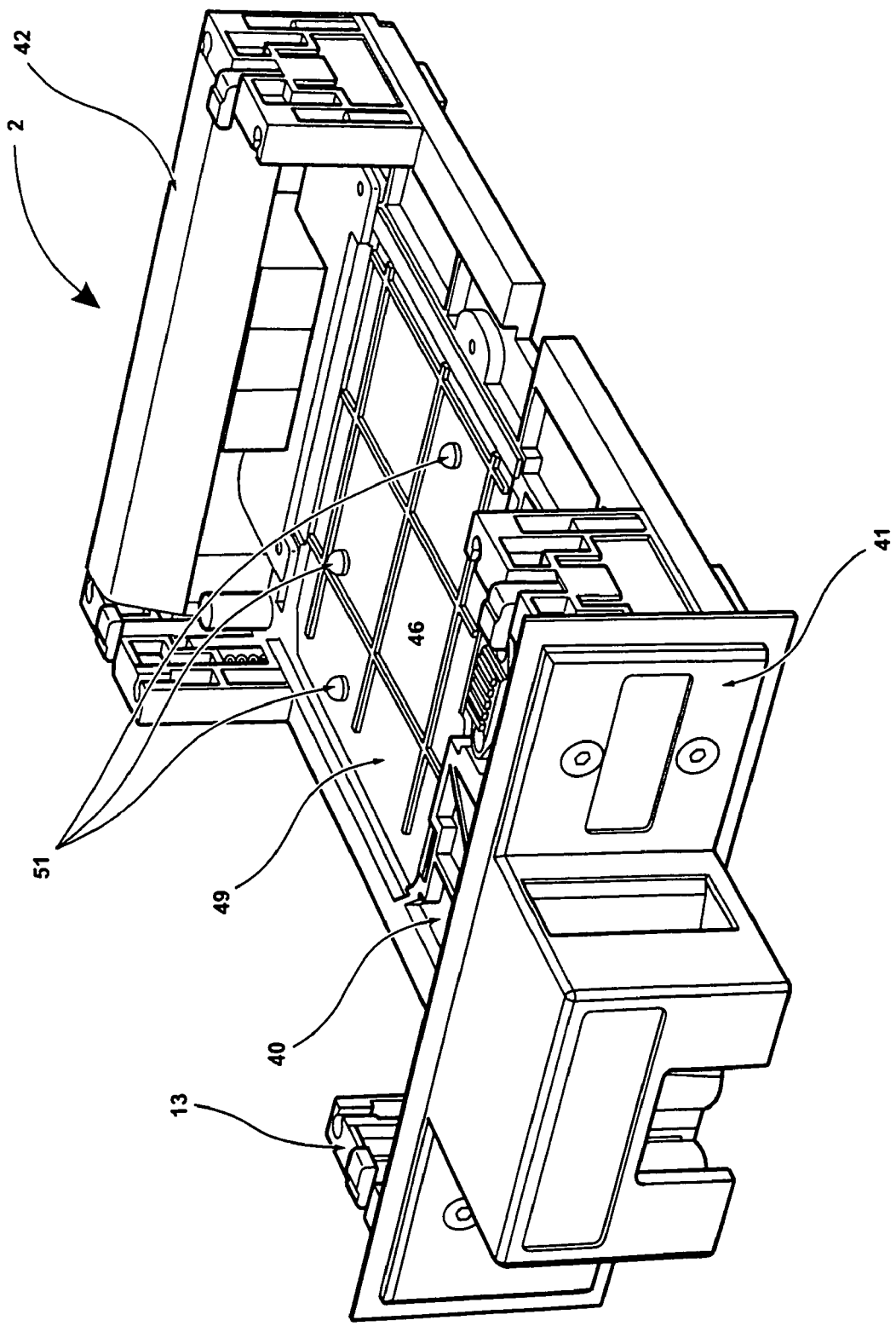
FIG. 20 is a perspective view of the disk drive carrier of FIG. 19 with a tray removed.

Referring now to FIGS. 17 and 18, a fourth example of a clamp assembly 313 suitable for clamping a disk drive 12 to a disk drive carrier 2 or other substrate will now be described.

In this example, four clamp elements 320 are mounted in respective through holes 321 provided in opposed side walls 322 of the carrier 2. Each clamp element 320 is generally planar and has a retaining tag 323 at one end. The retaining tag 323 fits into a slot 324 (shown in phantom in FIG. 18) in the carrier side wall 322 such that the clamp element 320 as a whole is cantilevered to the carrier 2.

Each clamp element 320 has a central opening 325. An integral cantilevered spring arm 326 overlies the opening 325. An actuator surface in the form of a release tag 327 projects downwardly and outwardly of the main body of the clamp element 320. The end of the clamp element 320 opposite the retaining tag 323 carries a bearing portion, which in this example is an inwardly facing projection 328.

As mentioned, each clamp element 320 is fixed at one end via the retaining tag 323 to the side wall 322 of the carrier 2. The free end 329 of each spring arm 326 engages with a portion 330 of the side wall 322 which is arranged such that the spring arm 326 is preloaded and bows relatively outwards (as shown in FIG. 18). This in turn biases the projections 328 inwardly of the carrier 2. The positions of the clamp elements 320 are arranged such that the projections 328 each enter and engage with the standard fixing holes provided in small form factor disk drives when the disk drive is in the carrier 2.

To release the clamp elements 320, the carrier 2 is transferred to a loading/unloading station. At the station, guide rails or fingers 331 or the like slide relatively longitudinally of the carrier 2 and engage the release tags 327. Because of the outward angling of the release tags 327, this engagement bends the clamp element 320 as a whole outwardly, thus withdrawing the projections 328 from the disk drive. The disk drive can then be removed and another disk drive inserted and clamped in a similar manner.

Again, it is preferred that the clamp elements 320 be of the damping or constrained layer spring material type. This may be achieved by making the clamp elements 320 of a laminate of two relatively rigid materials (such as metal or plastics) between which is sandwiched a more flexible material, which may simply be an adhesive. This arrangement provides for good damping of vibrations in addition to the good clamping force provided by the clamp elements 320.

This example provides for secure clamping of the disk drive. The projections 328 provide for vertical as well as horizontal restraint of the disk drive. The clamp elements 320 serve to damp vibrations which arise during operation of the disk drive. The clamp elements 320 can be made as a one-piece part, and can be made simply for example by stamping the base material or by moulding. The clamp elements 320 are therefore simple and inexpensive to manufacture and install in the carrier 2.

In general, disk drives come in three main types. In one type, electrical and data connections are made at the rear wall of the disk drive. In the second type, the disk drive has a so-called product card at its base such that electrical and data connections are made under the disk drive via the product card (these are of the same type). In the third type, electrical and data connections are made under the disk drive via one or more separate connection cards provided separately of the disk drive. Ideally, the disk drive carrier 2 should be generic to these three (two) types so that the same basic carrier 2 can be used for any of these types of disk drive.

An example of such a carrier 2 is shown most clearly in FIGS. 19 to 22. The carrier 2 has a generally planar base 40 with opposed front and rear end walls 41,42.

The carrier 2 has three regions of particular interest. The first region 43 is a relatively large, generally square or rectangular aperture 43 in the base 40 which can receive a removable disk drive card 44 (see FIG. 5). The second region 45 is provided by an aperture 45 in the base 40 which can receive a removable motor card 46 for providing electrical connections to the disk drive motor of the disk drive 12. The third region 47 is an aperture 47 through the rear wall 42 which can receive a removable data and electrical connector 48.

As will be immediately understood, the removable disk drive card 44, the removable motor card 46 and the removable data and electrical connector 48 may or may not be fitted depending on the particular type of disk drive 12 to be carried by the carrier 2. Where the disk drive card 44 and motor card 46 are fitted, a flexible electrical connector (not shown) can be used to provide an electrical and data connection from the motor card 46 and disk drive card 44 to the data and electrical connector 48. Ultimately, data and electrical connections are made externally of the carrier 2 at the rear of the carrier 2. By way of example, in the servo writing application discussed above, the riser card may be fitted to the relatively massive block 8.

Where a disk drive card 44 is to be used, it is preferred that this card 44 be biased into engagement with the connections provided under the disk drive 12. This can be achieved by providing a two-part cartridge having a tray 49 which is received in the aperture 43 of the carrier 2 and a corresponding card carrier 50 fitted to the tray 48 so that the card carrier 50 can move up and down. Three conical coil springs (not shown) are fitted over pegs 51 on the tray 49 to bias the card carrier 50 upwards. When the disk drive card 44 is mounted on the card carrier 50, the biasing arrangement forces the card 44 upwards, thus ensuring good contact with the contacts of the disk drive 12. This arrangement also provides for lateral compliance, which facilitates automated loading of the disk drive 12 onto the carrier 2. A cover 52 can be screwed to the carrier 2 to lock the various removable parts to the carrier 2 as required.

Embodiments of the present invention have been described with particular reference to the example illustrated. However, it will be appreciated that variations and modifications may be made to the examples described within the scope of the present invention. For example, in the preferred embodiment, four clamp assemblies are provided, one at each corner of the carrier. However, fewer, such as three, or more clamp assemblies may be provided. As another example, instead of inflatable actuators being used to clamp the disk drive to the block and springs used to bias away from the clamping state, springs could be used to clamp the carrier to the block and one or more inflatable actuators used to bias away from the clamping state. This arrangement would mean that the disk drive would remain clamped to the block in the event of failure of the air supply, though it may require strong springs to provide the required clamp force. As another example, in the preferred carrier a bias for the disk drive card is provided by springs in between the two parts of the two-part cartridge. As an alternative, springs could be provided between the cover and a single-piece cartridge.

The invention claimed is:

1. A disk drive support assembly constructed and arranged to support a disk drive whilst servo tracks are written to a disk of the disk drive, the assembly comprising:
   a removable disk drive carrier for carrying a disk drive;
   a relatively massive block;
   a cage in which the block is mounted for relative reciprocating movement in a first direction, the cage having a space to receive the disk drive carrier; and,
   a clamp arrangement comprising an actuator that is operable to move the cage relative to the block so as to clamp a disk drive carried by the disk drive carrier to the block via the disk drive carrier.

2. A support assembly according to claim 1, wherein the cage and block are arranged so that the cage can move relative to the block only in said first direction.

3. A support assembly according to claim 1, wherein the actuator comprises an inflatable actuator arranged between the block and the cage such that inflation of the inflatable actuator forces the cage to move relative to the block in the first direction.

4. A support assembly according to claim 1, comprising a biasing arrangement constructed and arranged to bias the cage in the direction opposite to the direction in which the cage is moved on operation of the actuator.

5. A support assembly according to claim 1, wherein the block is supported by plural vibration-damping mounts.

6. A support assembly according to claim 1, wherein the disk drive carrier has plural clamps for clamping a disk drive to the disk drive carrier.

7. A support assembly according to claim 1, wherein the disk drive carrier comprises plural disk drive carrier posts which pass through the disk drive carrier to bear against the block.

8. A support assembly according to claim 5, wherein the block is supported by exactly three vibration-damping mounts provided under the cage.

9. A support assembly according to claim 6, wherein the plural clamps are arranged to clamp a disk drive via corresponding plural posts provided on a the disk drive and which pass from one surface to an opposed surface of the disk drive.

10. A disk drive support assembly constructed and arranged to support a disk drive whilst servo tracks are written to a disk of the disk drive, the assembly comprising:
a removable disk drive carrier for carrying a disk drive:
a relatively massive block:
a clamp arrangement constructed and arranged to releasably clamp a disk drive to the block; and,
a cage in which the block is mounted for relative reciprocating movement in a first direction, the cage having a space to receive the disk drive carrier, the clamp arrangement comprising an actuator that is operable to move the cage relative to the block so as to clamp a disk drive carried by the disk drive carrier to the block via the disk drive carrier;
wherein the disk drive carrier comprises plural clamp arms and opposed disk drive carrier posts between which a disk drive can be clamped, the disk drive carrier posts passing through the disk drive carrier, the clamp arrangement being constructed and arranged to clamp a disk drive such that a lid of the cage bears against a first face of each of the clamp arms, a second face of each of the clamp arms bears against a first end of a respective one of a plurality of disk drive posts provided on a the disk drive and which pass from one surface to an opposed surface of the disk drive, and a second end of each of said disk drive posts bears against an end of a respective one the disk drive carrier posts, the other end of the disk drive carrier posts bearing against the block.

11. A clamp assembly for clamping a disk drive to a substrate, the clamp assembly comprising:
a clamp arm, the clamp arm being translatable back and forth along a first direction and being pivotable about a pivot axis transverse to the first direction;
a first biasing arrangement constructed and arranged to bias the clamp arm in the first direction towards a clamping position;
a second biasing arrangement constructed and arranged to bias the clamp arm to pivot about the pivot axis; and,
an actuator surface against which a clamp-release actuator can bear;
the assembly being arranged such that the clamp arm is normally biased towards the clamping position and such that when a clamp-release actuator bears against the actuator surface, the clamp arm moves in the first direction away from the clamping position and pivots about the pivot axis.

12. A clamp assembly according to claim 11, wherein the first biasing arrangement comprises at least one spring which is normally under compression.

13. A clamp assembly according to claim 11, wherein the second biasing arrangement comprises a leaf spring acting against an end of the clamp arm.

14. A clamp assembly according to claim 11, wherein the clamp arm is pivotally mounted in a pivot block which is mounted for translational movement in the first direction in a housing.

15. A clamp assembly according to claim 14, wherein the housing has a first surface that is generally parallel to the first direction, and a second, ramp surface at an angle to the first surface, the first and second surfaces acting to guide the translational and pivotal motion of the clamp arm.

16. A clamp assembly for clamping a disk drive to a substrate, the clamp assembly comprising:
a clamp element that is movable relative to the substrate, the clamp element having a projection for entering and engaging with an aperture in a disk drive, the clamp element further having a cam surface;
the substrate having a cam surface corresponding to the cam surface of the clamp element;
the arrangement being such that the clamp element is or can be withdrawn out of the path of travel of a disk drive to allow the disk drive to be loaded onto or unloaded from the substrate, and such that the clamp element moves or can be moved into engagement with the disk drive when the disk drive is to be clamped to the substrate such that the projection on the clamp element enters an aperture in the disk drive and such that the cam surfaces of the clamp element and the substrate engage each other to clamp the disk drive to the substrate by engagement of the projection with the aperture in the disk drive.

17. A clamp assembly according to claim 16, comprising a biasing arrangement for biasing the clamp element in its rest position towards the disk drive engagement position.

18. A clamp assembly according to claim 16, wherein the clamp element comprises a retraction post for engagement with a retraction device that is operable to withdraw the clamp element and thereby retract the projection of the clamp element from the aperture of the disk drive.

19. A clamp assembly according to claim 16, comprising a spring fixed at a first end with respect to the substrate and engaged at a second end with the clamp element for biasing the clamp element in its rest position towards the disk drive engagement position, the clamp element comprising a retraction post for engagement with the second end of the spring such that the spring is operable to withdraw the clamp element and thereby retract the projection of the clamp element from the aperture of the disk drive.

20. A clamp assembly according to claim 16, comprising a biasing arrangement for biasing the clamp element in its rest position away from the disk drive engagement position.

21. A clamp assembly according to claim 16, wherein the clamp element is able to move in three orthogonal directions.

22. A clamp assembly according to claim 16, comprising four said clamp elements, the projection of each clamp element being engageable with a respective one of four apertures in the disk drive.

23. A clamp assembly according to claim 17, wherein the biasing arrangement comprises a spring fixed at a first end with respect to the substrate and engaged at a second end with the clamp element.

24. A clamp assembly for clamping a disk drive to a substrate, the clamp assembly comprising:
a clamp spring mounted in a wall of the substrate and having a bearing portion that in the rest position of the spring projects through an aperture in the wall for engagement with a disk drive carried in use by the substrate; and,
an actuator for withdrawing the bearing portion of the clamp spring to allow the disk drive to be loaded onto or unloaded from the substrate.

25. A clamp assembly according to claim 24, comprising two clamp springs mounted in the wall of the substrate, each clamp spring having a bearing portion that in the rest position of the spring projects through an aperture in the wall for engagement with a disk drive carried in use by the substrate such that the two clamp springs engage the same side of the disk drive.

26. A clamp assembly according to claim 24, comprising two clamp springs mounted in the wall of the substrate, and comprising two clamp springs mounted in a second opposed wall of the substrate, each clamp spring having a bearing portion that in the rest position of the spring projects through an aperture in the wall for engagement with a disk drive carried in use by the substrate such that two of the clamp springs engage one side of the disk drive and the other two clamp springs engage a second opposite side of the disk drive, and comprising respective actuators for said two clamp springs and said two other clamp springs.

27. A clamp assembly according to claim 24, wherein the or at least one of the clamp springs has a projection for entering and engaging with an aperture in a disk drive.

28. A clamp assembly according to claim 25, wherein the actuator is operable to withdraw the bearing portions of the two clamp springs simultaneously.

29. A clamp assembly for clamping a disk drive to a substrate, the clamp assembly comprising:
a clamp spring mounted in a wall of the substrate and having a bearing portion that in the rest position of the spring projects through an aperture in the wall for engagement with a disk drive carried in use by the substrate; and,
an actuator for withdrawing the bearing portion of the clamp spring to allow the disk drive to be loaded onto or unloaded from the substrate;
wherein the actuator is a push rod which is connected at two positions to the clamp spring, the connection at a first of said positions being a fixed connection and the connection at the second of said positions being a sliding connection such that movement of the rod in a first direction moves the two connection points away from each other so as to withdraw the bearing portion of the clamp spring and movement of the rod in a second opposite direction allows the two connection points to move towards each other to cause the bearing portion of the clamp spring to move to a position at which it can engage the disk drive carried in use by the substrate.

30. A clamp assembly for clamping a disk drive to a substrate, the clamp assembly comprising:
a clamp element mounted in a wall of the substrate and having a bearing portion, the clamp element having a spring arm integrally formed therewith or attached thereto, the spring arm biasing the bearing portion to project through an aperture in the wall to a clamping position for engagement with a disk drive carried in use by the substrate.

31. A clamp assembly according to claim 30, wherein the bearing portion comprises a projection for entering and engaging with an aperture in a disk drive.

32. A clamp assembly according to claim 30, wherein the spring arm is integrally formed or attached to the clamp element at one end only of the spring arm, the other end of the spring arm being engaged with the wall of the substrate such that the spring arm biases the bearing portion to project through an aperture in the wall for engagement with a disk drive carried in use by the substrate.

33. A clamp assembly according to claim 30, wherein the clamp element has an actuator surface against which a clamp-release actuator can bear to move the bearing portion away from the clamping position.

34. A disk drive carrier for carrying a disk drive, the disk drive carrier comprising:
a casing;
the casing having a first region for receiving a removable disk drive card that provides a data connection to a disk drive mounted in the carrier;
the casing having a second region for receiving a removable motor card that provides an electrical connection to a motor of a disk drive mounted in the carrier; and,
the casing having a third region for receiving a removable data and electrical connector which can be connected to the removable motor card and removable disk drive card;
whereby the disk drive carrier can be used to provide data and electrical connections to a disk drive carried by the carrier optionally:
via a removable disk drive card, removable motor card and removable data and electrical connector received in the first, second and third regions respectively; or: via a product card of the disk drive carried by the carrier.

35. A disk drive carrier according to claim 34, comprising a biasing and laterally compliant arrangement for biasing a removable disk drive card received in the first region into engagement with a disk drive carried by the carrier.

36. A disk drive carrier according to claim 34, comprising a cover that can be removed to allow insertion and removal of at least one of the removable disk drive card, removable motor card and removable data and electrical connector.

37. A disk drive carrier according to claim 35, wherein the biasing and laterally compliant arrangement is removable from the carrier.

38. A disk drive carrier according to claim 37, wherein the biasing arrangement and laterally compliant is mounted on a tray which is removable from the disk drive carrier.

* * * * *